(12) United States Patent
Jin et al.

(10) Patent No.: US 12,219,651 B2
(45) Date of Patent: *Feb. 4, 2025

(54) COMMUNICATION METHOD, SOURCE BASE STATION, TARGET BASE STATION, CORE NETWORK DEVICE, AND TERMINAL DEVICE

(71) Applicant: HUAWEI TECHNOLOGIES CO., LTD., Guangdong (CN)

(72) Inventors: Yinghao Jin, Shanghai (CN); Henrik Olofsson, Kista (SE); Feng Han, Shanghai (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,932

(22) Filed: Aug. 3, 2023

(65) Prior Publication Data
US 2024/0040443 A1 Feb. 1, 2024

Related U.S. Application Data

(63) Continuation of application No. 17/199,928, filed on Mar. 12, 2021, now Pat. No. 11,758,441, which is a
(Continued)

(30) Foreign Application Priority Data

Aug. 11, 2017 (CN) .......................... 201710686415.2

(51) Int. Cl.
*H04W 36/00* (2009.01)
*H04W 8/08* (2009.01)
(Continued)

(52) U.S. Cl.
CPC ............. *H04W 76/30* (2018.02); *H04W 8/08* (2013.01); *H04W 36/0011* (2013.01);
(Continued)

(58) Field of Classification Search
CPC ..... H04W 36/06; H04W 36/08; H04W 36/24; H04W 48/00
See application file for complete search history.

(56) References Cited

U.S. PATENT DOCUMENTS 9,319,935 B2 4/2016 Fischer
2011/0268086 A1 11/2011 Liang et al.
(Continued)

FOREIGN PATENT DOCUMENTS

CN 101193440 6/2008
CN 101674621 3/2010
(Continued)

OTHER PUBLICATIONS

3GPP TR 23.799 V1.0.1, "3rd Generation Partnership Project; Technical Specification Group Services and System Aspects; Study on Architecture for Next Generation System (Release 14)," Sep. 2016, 423 pages.
(Continued)

*Primary Examiner* — Romani Ohri
(74) *Attorney, Agent, or Firm* — Fish & Richardson P.C.

(57) ABSTRACT

Embodiments of the present invention disclose a communication method, a source base station, a target base station, a core network device, and a terminal device, where the method includes: sending, by a source base station, a handover request to a target base station, where the handover request is used to request to hand over a session of a terminal device from the source base station to the target base station, and the handover request includes an identifier of a session requested to be handed over and indication information of a
(Continued)

network slice corresponding to the session; and receiving, by the source base station, a handover response message from the target base station.

13 Claims, 11 Drawing Sheets

Related U.S. Application Data continuation of application No. 16/443,304, filed on Jun. 17, 2019, now Pat. No. 10,952,105, which is a continuation of application No. PCT/CN2018/099875, filed on Aug. 10, 2018.

(51) Int. Cl.
| | |
|---|---|
| H04W 36/08 | (2009.01) |
| H04W 76/27 | (2018.01) |
| H04W 76/30 | (2018.01) |
| H04W 80/10 | (2009.01) |

(52) U.S. Cl.
CPC ....... *H04W 36/0079* (2018.08); *H04W 36/08* (2013.01); *H04W 76/27* (2018.02); *H04W 80/10* (2013.01); *H04W 36/087* (2023.05)

(56) References Cited

U.S. PATENT DOCUMENTS

| | | | |
|---|---|---|---|
| 2011/0286321 | A1 | 11/2011 | Ran et al. |
| 2013/0132286 | A1 | 5/2013 | Schaefer et al. |
| 2015/0215822 | A1 | 7/2015 | Won et al. |
| 2017/0019945 | A1* | 1/2017 | Chiba ................... H04W 76/15 |
| 2017/0079059 | A1 | 3/2017 | Li et al. |
| 2017/0257802 | A1* | 9/2017 | Roeland ............ H04W 36/0033 |
| 2017/0357528 | A1* | 12/2017 | Puranik ................... H04L 49/70 |
| 2018/0310169 | A1 | 10/2018 | Wang |
| 2018/0317148 | A1 | 11/2018 | Jin et al. |
| 2019/0021047 | A1 | 1/2019 | Zong |
| 2019/0158360 | A1* | 5/2019 | Xu .......................... H04L 41/12 |
| 2019/0174498 | A1* | 6/2019 | Samdanis ............. H04W 16/10 |
| 2019/0182737 | A1* | 6/2019 | Futaki ................... H04W 24/10 |
| 2019/0327153 | A1* | 10/2019 | Wahlqvist ........... H04L 41/5003 |
| 2020/0059989 | A1 | 2/2020 | Velev et al. |

FOREIGN PATENT DOCUMENTS

| | | |
|---|---|---|
| CN | 102238658 | 11/2011 |
| CN | 102905328 | 1/2013 |
| CN | 104105152 | 10/2014 |
| CN | 104539596 | 4/2015 |
| CN | 106134255 | 11/2016 |
| CN | 106375987 | 2/2017 |
| CN | 106454943 | 2/2017 |
| CN | 106792931 | 5/2017 |
| CN | 106792936 | 5/2017 |
| CN | 106937362 | 7/2017 |
| CN | 106982410 | 7/2017 |
| CN | 107277883 | 10/2017 |
| JP | 2008503172 | 1/2008 |
| JP | 2013520910 | 6/2013 |
| JP | 2014522211 | 8/2014 |
| JP | 2017522826 | 8/2017 |
| KR | 20150103259 | 9/2015 |
| KR | 20170058848 | 5/2017 |
| RU | 2576019 | 2/2016 |
| WO | 2011144000 | 11/2011 |
| WO | 2012155657 | 11/2012 |
| WO | 2014156121 | 10/2014 |
| WO | 2016141884 | 9/2016 |
| WO | 2017007383 | 1/2017 |
| WO | 2017011827 | 1/2017 |
| WO | 2017026842 | 2/2017 |
| WO | 2017034352 | 3/2017 |
| WO | 2017101511 | 6/2017 |
| WO | 2017113109 | 7/2017 |
| WO | 2017121217 | 7/2017 |
| WO | 2017135860 | 8/2017 |

OTHER PUBLICATIONS

3GPP TR 38.801 V14.0.0 (Release 14), 3rd Generation Partnership Project, Technical Specification Group Radio Access Network, Study on new radio access technology: Radio access architecture and interfaces, Mar. 2017, 91 pages.

3GPP TS 23.501 V1.2.0 (Release 15), 3rd Generation Partnership Project, Technical Specification Group Services and System Aspects, System Architecture for the 5G System, Stage 2, Jul. 2017, 166 pages.

3GPP TS 23.502 V0.5.0, "3rd Generation Partnership Project; Technical Specification Group Services and System Aspects; Procedures for the 5G System; Stage 2 (Release 15)," Jul. 2017, 148 pages.

3GPP TS 38.212 V0.0.0 (Release 15), 3rd Generation Partnership Project, Technical Specification Group Radio Access Network, NR, Multiplexing and channel coding, May 2017, 10 pages.

3GPP TS 38.300 V0.6.0 (Release 15), 3rd Generation Partnership Project, Technical Specification Group Radio Access Network, NR; NR and NG-RAN Overall Description, Stage 2, Aug. 2017, 58 pages.

3GPP TS 38.331 V0.0.4, "3rd Generation Partnership Project; Technical Specification Group Radio Access Network; NR; Radio Resource Control (RRC); Protocol Specification (Release 15)," Jun. 2017, 22 pages.

3GPP TS 38.413 V0.2.1 Release 15) (Aug. 2017), 3rd Generation Partnership Project; Technical Specification Group Radio Access Network, NG Radio Access Network, NG Application Protocol, Aug. 2017, 81 pages.

3GPP TS 38.423 V0.1.10 (Release 15), 3rd Generation Partnership Project; Technical Specification Group Radio Access Network, NG Radio Access Network, Xn application protocol, Jun. 2017, 53 pages.

Catt, "Discussion on Slice-aware mobility," 3GPP TSG-RAN WG3 #95bis, R3-171012, Spokane, Washington, USA, Apr. 3-7, 2017, 2 pages.

Extended European Search Report issued in European Application No. 18842877.5 on Jun. 19, 2020, 14 pages.

Huawei, "Procedure of Xn based mobility for slicing," 3GPP TSG-RAN WG3 Meeting #AH, R3-172486, Qingdao, China, Jun. 27-29, 2017, 3 pages.

Huawei, "Xn based mobility," 3GPP TSG-RAN3 Meeting AH-1801, R3-180473, Sophia Antipolis, France, Jan. 22-26, 2018, 4 pages.

LG Electronics Inc., "Considering slice related information during Xn-based handover," 3GPP TSG-RAN WG3 Meeting #NR AdHoc, R3-172565, Qingdao, P. R. China, Jun. 27-29, 2017, 8 pages.

MediaTek Inc., "Optimization and comparison of Polar code rate-matching design" R1-1710825 3GPP TSG RAN WGI RAN1 Meeting Ad-Hoc #2, Qingdao, China, Jun. 27-30, 2017, 7 pages.

Nokia et al., "Polar design for control channels" R1-1703106 3GPP TSG-RAN WG1 Meeting #88, Athens, Greece, Feb. 13-17, 2017, 10 pages.

Office Action in Korean Appln. No. 2021-7031973, dated Nov. 9, 2022, 10 pages (with English translation).

Office Action issued in Chinese Application No. 201710685415.2 on Jun. 22, 2022, 4 pages.

Office Action issued in Chinese Application No. 201710686415.2 on Dec. 2, 2020, 9 pages.

Office Action issued in Chinese Application No. 202010176221.X on Sep. 25, 2020, 23 pages (with English translation).

Office Action issued in Indian Application No. 201947034091 on Mar. 16, 2021, 7 pages.

Office Action issued in Israeli Application No. 269926 on Jun. 6, 2022, 5 pages.

Office Action issued in Japanese Application No. 2019-544921 on Nov. 10, 2020, 12 pages (with English translation).

(56) References Cited

OTHER PUBLICATIONS

Office Action issued in Korean Application No. 2019-7026830 on Sep. 3, 2020, 12 pages (with English translation).
Office Action issued in Russian Application No. 2019132118/07(063298) on Nov. 26, 2021, 18 pages (with English translation).
PCT International Search Report and Written Opinion in International Application No. 2018/099,875, dated Oct. 31, 2018, 11 pages (With Partial English translation).
Search Report issued in Chinese Application No. 201810730743.2, dated Jun. 1, 2015, 8 pages.
Search Report issued in Chinese Application No. 201810873031.6, dated Jun. 1, 2015, 9 pages.
Huawei et al., "TS 23.502: Handling PDU sessions rejected by RAN during handover," SA WG2 Meeting #121, S2-173138, May 15-19, 2017, Hangzhou, P. R. China, 9 pages.
3GPP TS 23.502 V0.3.0, "3rd Generation Partnership Project; Technical Specification Group Services and System Aspects; Procedures for the 5G System; Stage 2 (Release 15)," Mar. 2017, 116 pages.
Extended European Search Report in European Appln. No. 24177020.5, mailed on Dec. 5, 2024, 15 pages.

\* cited by examiner

COMMUNICATION METHOD, SOURCE BASE STATION, TARGET BASE STATION, CORE NETWORK DEVICE, AND TERMINAL DEVICE

CROSS-REFERENCE TO RELATED APPLICATIONS

This application is a continuation of U.S. patent application Ser. No. 17/199,928, filed on Mar. 12, 2021, which is a continuation of U.S. patent application Ser. No. 16/443,304, filed on Jun. 17, 2019, now U.S. Pat. No. 10,952,105, which is a continuation of International Application No. PCT/CN2018/099875, filed on Aug. 10, 2018. The International Application claims priority to Chinese Patent Application No. 201710686415.2, filed on Aug. 11, 2017. All of the afore-mentioned patent applications are hereby incorporated by reference in their entireties.

TECHNICAL FIELD

The present disclosure relates to the field of communications technologies, and in particular, to a communication method, a source base station, a target base station, a core network device, and a terminal device.

BACKGROUND

A concept of a network slice is introduced in 5G. A terminal device currently performs a plurality of sessions, and network slices corresponding to different sessions are required to serve the sessions. In this case, if the terminal device needs to access a network and establish a plurality of sessions, a base station connected to the terminal device needs to support network slices corresponding to all sessions or some sessions in the terminal device.

Under the circumstances, it is worth considering how to increase a handover success rate.

SUMMARY

To resolve a technical problem, embodiments of the present invention provide a communication method, a source base station, a target base station, a core network device, and a terminal device, so as to increase a handover success rate.

According to a first aspect, an embodiment of the present invention provides a communication method, including:
sending, by a source base station, a handover request to a target base station, where the handover request is used to request to hand over a session of a terminal device from the source base station to the target base station, and the handover request includes an identifier of a session requested to be handed over and indication information of a network slice corresponding to the session; and receiving, by the source base station, a handover response message from the target base station, where the handover response message includes reject indication information, and the reject indication information is used to indicate cause information corresponding to a session, which is rejected by the target base station due to a network slice, from the session requested to be handed over.

In the first aspect, the source base station can obtain, by using the target base station, the cause information that is corresponding to the session, which is rejected by the target base station due to a network slice, to help provide information for another session that needs to be requested to be handed over to the target base station. When a session corresponding to the same network slice needs to be handed over from the source base station, the source base station may directly determine whether the session can be handed over to the target base station, thereby increasing a handover success rate.

With reference to the first aspect, in an optional implementation, the source base station sends a handover command to the terminal device if the handover response message is a handover request acknowledge message, where the handover command includes retransmission indication information corresponding to the session that is rejected by the target base station, and the retransmission indication information corresponding to the session is used to indicate whether the terminal device is allowed to route, to a network slice supported by the target base station, a data flow of the rejected session. Optionally, the retransmission indication information may not indicate a specific network slice to which the data flow is routed. In this way, the terminal device can obtain which sessions can still be re-established in the target base station after rejection, thereby improving session handover flexibility.

With reference to the first aspect, in an optional implementation, the method further includes: sending, by the source base station, a radio resource control RRC connection release message to the terminal device if the handover response message is a handover failure message. Optionally, the RRC connection release message includes indication information of a network slice supported by a neighboring cell of a source cell, indication information of a network slice supported by a TA/RA to which the neighboring cell of the source cell belongs, or information about a network slice supported by a neighboring base station of the source base station. In this case, the terminal device can release an RRC connection as soon as possible, to avoid a subsequent radio link failure, and reduce signaling overheads.

According to a second aspect, an embodiment of the present invention provides a communication method, including:
receiving, by a target base station, a handover request from a source base station, where the handover request is used to request to hand over a session of a terminal device from the source base station to the target base station, and the handover request includes an identifier of a session requested to be handed over and indication information of a network slice corresponding to the session; and sending, by the target base station, a handover response message to the source base station, where the handover response message includes reject indication information, and the reject indication information is used to indicate cause information corresponding to a session, which is rejected by the target base station due to a network slice, from the session requested to be handed over.

In the second aspect, the target base station can notify the source base station of the cause information that is corresponding to the session, which is rejected due to a network slice of the target base station, to help provide information for another session that is in the source base station and that needs to be requested to be handed over to the target base station. When a session corresponding to the same network slice needs to be handed over from the source base station, the source base station may directly determine whether the session can be handed over to the target base station, thereby increasing a handover success rate.

With reference to the second aspect, in an optional implementation, the target base station receives a handover acknowledge message from the terminal device, and the target base station sends a path switch request to a core network device, where the path switch request includes an identifier of a session that is accepted by the target base station and an identifier of the session that is rejected by the target base station; and the target base station receives a path switch request response message from the core network device, where the path switch request response message includes an identifier of a session for which path switch has been successfully completed. In this case, the core network device performs path switching on the accepted session.

According to a third aspect, an embodiment of the present invention provides a communication method, including:

receiving, by a core network device, a path switch request from a target base station, where the path switch request includes an identifier of a session that is accepted by the target base station and an identifier of a session that is rejected by the target base station; performing, by the core network device, path switching on the accepted session, and performing deactivating or releasing the rejected session; and sending, by the core network device, a path switch request response message to the target base station, where the path switch request response message includes an identifier of a session for which path switch has been successfully completed.

In the third aspect, the identifier of the accepted session and the identifier of the rejected session are carried in the path switch request, so that the core network device can determine a deactivated session from all stored sessions of the terminal device. In this way, the core network device does not need to deal with such sessions, and only needs to deal with the accepted session and the rejected session, thereby improving processing efficiency.

With reference to the first aspect or the second aspect, in a possible implementation, the session requested to be handed over includes a first session, and a network slice corresponding to the first session is supported by the target base station. In this case, the target base station does not need to perform admission control on a second session, thereby saving processing time for performing admission control on the second session. Alternatively, the session requested to be handed over includes a first session and a second session, a network slice corresponding to the first session is supported by the target base station, and a network slice corresponding to the second session is not supported by the target base station. Therefore, the target base station can directly determine a session that is not supported by the target base station, thereby improving efficiency of determining a handover response message. Certainly, special classification processing may not be performed on all sessions that need to be handed over.

With reference to the first aspect, the second aspect, or the third aspect, in a possible implementation, the cause information is that: the target base station does not support a network slice corresponding to the rejected session, or a resource is not available for a network slice being supported by the target base station and corresponding to the rejected session.

With reference to the first aspect or the second aspect, in a possible implementation, if the handover response message is a handover request acknowledge message, the handover response message further includes retransmission indication information corresponding to the session that is rejected by the target base station, and the retransmission indication information corresponding to the session is used to indicate whether the terminal device is allowed to route, to a network slice supported by the target base station, a data flow of the rejected session. In this way, the terminal device can obtain which sessions can still be re-established in the target base station after rejection, thereby improving session handover flexibility.

With reference to the first aspect or the second aspect, in an optional implementation, if the handover response message is a handover request acknowledge message, the handover request acknowledge message further includes an identifier of a rejected bearer or an identifier of a rejected data flow of the session requested to be handed over, so that the source base station can acknowledge the rejected bearer or the rejected data flow.

With reference to the first aspect or the second aspect, in an optional implementation, a handover request response message further includes information about the supported network slice of the target base station. This helps the target base station notify the source base station of information about a network slice currently supported by the target base station, thereby reducing interaction between the source base station and the target base station.

With reference to the second aspect or the third aspect, in an optional implementation, the path switch request further includes indication information of the network slice corresponding to the session that is rejected by the target base station. In this case, the core network device may compare the network slice corresponding to the rejected session with a network slice that is supported by a target base station and that is stored in the core network device, to obtain whether the session is rejected because the target base station does not support the network slice. If yes, the core network device subsequently triggers a process of removing the session, to reduce storage space occupied by such sessions in the core network device. If no, the core network device may subsequently trigger a process of deactivating the session, so that the core network device can quickly resume the session when the session needs to be activated.

With reference to the second aspect or the third aspect, in an optional implementation, the path switch request further includes the cause information corresponding to the session that is rejected by the target base station. The cause information is carried, so that the core network device can perform different processing on sessions rejected for different causes.

According to a fourth aspect, an embodiment of the present invention provides a communication method, including:

receiving, by a terminal device, a radio resource control RRC connection release message from a source base station; and releasing an RRC connection, where the RRC connection release message includes indication information of a supported network slice of a neighboring cell of a source cell, indication information of a supported network slice of a TA/RA to which the neighboring cell of the source cell belongs, or information about a supported network slice of a neighboring base station of the source base station.

In the fourth aspect, the terminal device can release the RRC connection as soon as possible, to avoid a subsequent radio link failure, and reduce signaling overheads.

According to a fifth aspect, an embodiment of the present invention provides a communication method, including:

sending, by a source base station, a first handover request to a core network device, where the first handover request is used to request to hand over a session of a terminal device from the source base station to a target base station, and the first handover request includes information about the target base station and an identifier of a session requested to be handed over; and receiving, by the source base station, a first handover response message from the core network device, where the first handover response message includes reject indication information, and the reject indication information is used to indicate cause information corresponding to a session, which is rejected by the target base station due to a network slice, from the session requested to be handed over.

In the fifth aspect, the source base station can obtain, by using the core network device, the cause information that is corresponding to the session, which is rejected by the target base station, due to a network slice, to help provide information for another session that needs to be requested to be handed over to the target base station. When a session corresponding to the same network slice needs to be handed over from the source base station, the source base station may directly determine whether the session can be handed over to the target base station, thereby increasing a handover success rate.

With reference to the fifth aspect, in a possible implementation, the method further includes: sending, by the source base station, a handover command to the terminal device if the first handover response message is a first handover request acknowledge message, where the handover command includes retransmission indication information corresponding to the session that is rejected by the target base station, and the retransmission indication information corresponding to the session is used to indicate whether the terminal device is allowed to route, to a supported network slice of the target base station, a data flow of the rejected session. Optionally, the retransmission indication information may not indicate a specific network slice to which the data flow is routed. In this way, the terminal device can obtain which sessions can still be re-established in the target base station after rejection, thereby improving session handover flexibility.

With reference to the fifth aspect, in a possible implementation, the method further includes: sending, by the source base station, an RRC connection release message to the terminal device if the first handover response message is a first handover failure message. Optionally, the RRC connection release message includes indication information of a supported network slice of a neighboring cell of the source base station, indication information of a supported network slice of a TA/RA to which the neighboring cell of the source base station belongs, or information about a supported network slice of a neighboring base station of the source base station. In this case, the terminal device can release an RRC connection as soon as possible, to avoid a subsequent radio link failure, and reduce signaling overheads.

According to a sixth aspect, an embodiment of the present invention provides a communication method, including:
receiving, by a core network device, a first handover request from a source base station, where the first handover request is used to request to hand over a session of a terminal device from the source base station to a target base station, and the first handover request includes information about the target base station and an identifier of a session requested to be handed over; and sending, by the core network device, a first handover response message to the source base station, where the first handover response message includes reject indication information, and the reject indication information is used to indicate cause information corresponding to a session, which is rejected by the target base station due to a network slice, from the session requested to be handed over.

In the sixth aspect, the core network device can notify the source base station of the cause information that is corresponding to the session, which is rejected by the target base station, due to a network slice, to help provide information for another session that is in the source base station and that needs to be requested to be handed over to the target base station. When a session corresponding to the same network slice needs to be handed over from the source base station, the source base station may directly determine whether the session can be handed over to the target base station, thereby increasing a handover success rate.

With reference to the sixth aspect, in a possible implementation, before the sending, by the core network device, a first handover response message to the source base station, the method further includes: sending, by the core network device, a second handover request to the target base station, where the second handover request includes an identifier of a session and indication information of a network slice corresponding to the session; and receiving, by the core network device, a second handover response message from the target base station, where the second handover response message includes the reject indication information. In this way, the core network device notifies the source base station of the reject indication information.

According to a seventh aspect, an embodiment of the present invention provides a communication method, including:
receiving, by a target base station, a second handover request from a core network device, where the second handover request includes an identifier of a session and indication information of a network slice corresponding to the session; and sending, by the target base station, a second handover response message to a source base station, where the second handover response message includes reject indication information, and the reject indication information is used to indicate cause information corresponding to a session, which is rejected by the target base station due to a network slice, from the session requested to be handed over.

In the seventh aspect, the target base station can notify the core network device of the cause information that is corresponding to the session, which is rejected by the target base station, due to a network slice, so that the core network device notifies the source base station of the information. This helps provide information for another session that is in the source base station and that needs to be requested to be handed over to the target base station. When a session corresponding to the same network slice needs to be handed over from the source base station, the source base station may directly determine whether the session can be handed over to the target base station, thereby increasing a handover success rate.

With reference to the fifth aspect, the sixth aspect, or the seventh aspect, in a possible implementation, the cause information is that: the target base station does not support a network slice corresponding to the rejected session, or a resource is not available for a network slice being supported by the target base station and corresponding to the rejected session.

With reference to the fifth aspect or the sixth aspect, in a possible implementation, the first handover request further includes first indication information, and the indication information indicates that the source base station does not determine or does not know a supported network slice of the target base station, so that the core network device obtains that the source base station does not know information about the supported network slice of the target base station. Therefore, the information about the supported network slice of the target base station may be added to the first handover response message. This reduces interaction between the source base station and the target base station, and improves efficiency of obtaining the information about the network slice.

With reference to the fifth aspect or the sixth aspect, in a possible implementation, the target base station may be a base station that has a communications interface with the source base station, or may be a base station that has no communications interface with the source base station. Optionally, the first handover request may include second indication information indicating that there is no communications interface between the source base station and the target base station. This helps the core network device feed back the information about the supported network slice of the target base station.

With reference to the fifth aspect or the sixth aspect, in a possible implementation, if the first handover response message is a first handover request acknowledge message, the first handover response message further includes retransmission indication information corresponding to the session that is rejected by the target base station, and the retransmission indication information corresponding to the session is used to indicate whether the terminal device is allowed to route, to a supported network slice of the target base station, a data flow of the rejected session. In this way, the terminal device can obtain which sessions can still be re-established in the target base station after rejection, thereby improving session handover flexibility.

With reference to the fifth aspect or the sixth aspect, in a possible implementation, if the first handover response message is a first handover request acknowledge message, the first handover request acknowledge message further includes an identifier of a rejected bearer or an identifier of a rejected data flow of the session requested to be handed over, so that the source base station can acknowledge the rejected bearer or the rejected data flow.

With reference to the fifth aspect or the sixth aspect, in a possible implementation, if the first handover response message is a first handover request acknowledge message, the first handover request acknowledge message further includes the information about the supported network slice of the target base station. For example, if the first handover request includes the first indication information indicating that the source base station does not determine the supported network slice of the target base station, or the core network device determines, based on the second indication information that is carried in the first handover request and that indicates that there is no communications interface between the source base station and the target base station, that the source base station does not know the supported network slice of the target base station, the information about the supported network slice of the target base station may be carried. This reduces interaction between the source base station and the target base station, and improves efficiency of obtaining the information about the network slice.

With reference to the fifth aspect or the sixth aspect, in a possible implementation, the first handover request further includes indication information of a network slice corresponding to the session requested to be handed over, so that the core network device can directly determine the indication information of the network slice corresponding to the session requested to be handed over. It can be understood that, the first handover request may not include the indication information of the network slice corresponding to the session requested to be handed over. This is not limited in this embodiment of the present invention.

With reference to the fifth aspect or the sixth aspect, in a possible implementation, the first handover request further includes an identifier of a data flow of the session that is requested to be handed over and that needs to be established and QoS information corresponding to the data flow. This can save search time, reduce a handover delay, and improve handover efficiency.

With reference to the fifth aspect or the sixth aspect, in a possible implementation, the first handover request further includes aggregate maximum bit rate AMBR information corresponding to the session. The information is included in the first handover request, so that search time is saved, a handover delay is reduced, and handover efficiency is improved.

With reference to the sixth aspect or the seventh aspect, in a possible implementation, the session included in the second handover request is a first session, and a network slice corresponding to the first session is supported by the target base station. In this case, the target base station does not need to perform admission control on a second session, thereby saving processing time for performing admission control on the second session. Alternatively, the session included in the second handover request is the first session and a second session, a network slice corresponding to the first session is supported by the target base station, and a network slice corresponding to the second session is not supported by the target base station. Therefore, the target base station can directly determine a session that is not supported by the target base station, thereby improving efficiency of determining a handover response message. Certainly, special classification processing may not be performed on all sessions that need to be handed over.

With reference to the sixth aspect or the seventh aspect, in a possible implementation, if the second handover response message is a second handover request acknowledge message, the second handover response message further includes retransmission indication information corresponding to the session that is rejected by the target base station, and the retransmission indication information corresponding to the session is used to indicate whether the terminal device is allowed to route, to a supported network slice of the target base station, a data flow of the rejected session. In this way, by using the source base station, the core network device can obtain which sessions can still be re-established in the target base station after rejection, thereby improving session handover flexibility.

With reference to the sixth aspect or the seventh aspect, in a possible implementation, if the second handover response message is a second handover request acknowledge message, the second handover request acknowledge message further includes an identifier of a rejected bearer or an identifier of a rejected data flow of the session included in the second handover request, so that the source base station can acknowledge the rejected bearer or the rejected data flow.

According to an eighth aspect, an embodiment of the present invention provides a communication method, including: sending, by a first base station, a first message to a core network device, where the first message is used to obtain information about a supported network slice for a PLMN of the core network device; and receiving, by the first base station, a second message from the core network device, where the second message includes information about a supported network slice for a PLMN served by the core network device.

In the eighth aspect, the first base station may obtain, by using the core network device, indication information of the supported network slice for the PLMN the core network device, and feedback, at a PLMN granularity, the supported network slice of the core network device. This can improve accuracy of selecting, by the first base station, a core network device for a session of a terminal device.

According to a ninth aspect, an embodiment of the present invention provides a communication method, including: receiving, by a core network device, a first message from a first base station, where the first message is used to obtain information about a supported network slice of the core network device for a PLMN; and sending, by the core network device, a second message to the first base station, where the second message includes information about a supported network slice for a PLMN served by the core network device.

In the ninth aspect, the core network device may send, to the first base station, indication information of the supported network slice for the PLMN served by the core network device, and feed back the supported network slice of the core network device (at a PLMN granularity). This can improve accuracy of selecting, by the first base station, a core network device for a session of a terminal device.

According to a tenth aspect, an embodiment of the present invention provides a base station, the base station is a source base station, and the source base station includes: a transmitting unit, configured to send a handover request to a target base station, where the handover request is used to request to hand over a session of a terminal device from the source base station to the target base station, and the handover request includes an identifier of a session requested to be handed over and indication information of a network slice corresponding to the session; and a receiving unit, configured to receive a handover response message from the target base station, where the handover response message includes reject indication information, and the reject indication information is used to indicate cause information corresponding to a session, which is rejected by the target base station due to a network slice, from the session requested to be handed over.

Optionally, the source base station may further implement some or all optional implementations of the first aspect.

According to an eleventh aspect, an embodiment of the present invention provides a base station, the base station is a target base station, and the target base station includes: a receiving unit, configured to receive a handover request from a source base station, where the handover request is used to request to hand over a session of a terminal device from the source base station to the target base station, and the handover request includes an identifier of a session requested to be handed over and indication information of a network slice corresponding to the session; and a transmitting unit, configured to send a handover response message to the source base station, where the handover response message includes reject indication information, and the reject indication information is used to indicate cause information corresponding to a session, which is rejected by the target base station due to a network slice, from the session requested to be handed over.

Optionally, the source base station may further implement some or all optional implementations of the second aspect.

According to a twelfth aspect, an embodiment of the present invention provides a core network device, and the core network device includes: a receiving unit 1001, configured to receive a path switch request from a target base station, where the path switch request includes an identifier of a session that is accepted by the target base station and an identifier of a session that is rejected by the target base station; a processing unit 1002, configured to perform path switching on the accepted session, and perform deactivating or releasing the rejected session; and a transmitting unit 1003, configured to send a path switch request response message to the target base station, where the path switch request response message includes an identifier of a session for which path switch has been successfully completed.

Optionally, the source base station may further implement some or all optional implementations of the third aspect.

According to a thirteenth aspect, an embodiment of the present invention provides a terminal device, and the terminal device includes: a receiving unit, configured to receive a radio resource control RRC connection release message from a source base station; and a processing unit, configured to release an RRC connection, where the RRC connection release message includes indication information of a supported network slice of a neighboring cell of a source cell, indication information of a supported network slice of a TA/RA to which the neighboring cell of the source cell belongs, or information about a supported network slice of a neighboring base station of the source base station.

Optionally, the terminal device may further implement the communication method in the fourth aspect.

According to a fourteenth aspect, an embodiment of the present invention provides a base station, the base station is a source base station, and the source base station includes: a transmitting unit, configured to send a first handover request to a core network device, where the first handover request is used to request to hand over a session of a terminal device from the source base station to a target base station, and the first handover request includes information about the target base station and an identifier of a session requested to be handed over; and a receiving unit, configured to receive a first handover response message from the core network device, where the first handover response message includes reject indication information, and the reject indication information is used to indicate cause information corresponding to a session, which is rejected by the target base station due to a network slice, from the session requested to be handed over.

Optionally, the source base station may further implement some or all optional implementations of the fifth aspect.

According to a fifteenth aspect, an embodiment of the present invention provides a core network device, and the core network device includes: a receiving unit, configured to receive a first handover request from a source base station, where the first handover request is used to request to hand over a session of a terminal device from the source base station to a target base station, and the first handover request includes information about the target base station and an identifier of a session requested to be handed over; and a transmitting unit, configured to send a first handover response message to the source base station, where the first handover response message includes reject indication information, and the reject indication information is used to indicate cause information corresponding to a session, which is rejected by the target base station due to a network slice, from the session requested to be handed over.

Optionally, the core network device may further implement some or all optional implementations of the sixth aspect.

According to a sixteenth aspect, an embodiment of the present invention provides a base station, the base station is a target base station, and the target base station includes: a receiving unit, configured to receive a second handover request from a core network device, where the second handover request includes an identifier of a session and indication information of a network slice corresponding to the session; and a transmitting unit, configured to send a handover response message to the source base station, where the handover response message includes reject indication information, and the reject indication information is used to indicate cause information corresponding to a session, which is rejected by the target base station due to a network slice, from the session requested to be handed over.

Optionally, the target base station may further implement some or all optional implementations of the seventh aspect.

According to a seventeenth aspect, an embodiment of the present invention provides a base station, and the base station is a first base station, including: a transmitting unit 1101, configured to send a first message to a core network device, where the first message is used to obtain information about a supported network slice of the core network device for a PLMN; and a receiving unit 1102, configured to receive a second message from the core network device, where the second message includes information about a supported network slice for a PLMN served by the core network device.

Optionally, the source base station may further implement some or all optional implementations of the seventh aspect.

According to an eighteenth aspect, an embodiment of the present invention provides a core network device, and the core network device includes: a receiving unit, configured to receive a first message from a first base station, where the first message is used to obtain information about a supported network slice of the core network device for a PLMN; and a transmitting unit, configured to send a second message to the first base station, where the second message includes information about a supported network slice for a PLMN served by the core network device.

Optionally, the source base station may further implement some or all optional implementations of the ninth aspect.

According to a nineteenth aspect, a communications apparatus is provided. The communications apparatus may be the base station in the foregoing method design, or may be a chip disposed in the base station. The communications apparatus includes a memory, a transceiver, and a processor. The memory is configured to store computer executable program code, and the processor is coupled to the memory and the transceiver. The program code stored in the memory includes an instruction, and when the processor executes the instruction, the communications apparatus is enabled to perform the method performed by the terminal device in any possible design of the first aspect, the second aspect, the fifth aspect, the seventh aspect, or the eighth aspect.

According to a twentieth aspect, a communications apparatus is provided. The communications apparatus may be the core network device in the foregoing method design, or may be a chip disposed in the core network device. The communications apparatus includes a memory, a transceiver, and a processor. The memory is configured to store computer executable program code, and the processor is coupled to the memory and the transceiver. The program code stored in the memory includes an instruction, and when the processor executes the instruction, the communications apparatus is enabled to perform the method performed by the network device in any possible design of the third aspect, the sixth aspect, or the ninth aspect.

According to a twenty-first aspect, a communications apparatus is provided. The communications apparatus may be the terminal device in the foregoing method design, or may be a chip disposed in the terminal device. The communications apparatus includes a memory, a transceiver, and a processor. The memory is configured to store computer executable program code, and the processor is coupled to the memory and the transceiver. The program code stored in the memory includes an instruction, and when the processor executes the instruction, the communications apparatus is enabled to perform the method performed by the terminal device in any possible design of the fourth aspect.

According to a twenty-second aspect, a computer program product is provided, and the computer program product includes computer program code. When the computer program code runs on a computer, the computer is enabled to perform the method in any one of the first aspect to the ninth aspect and the possible implementations of the first aspect to the ninth aspect.

According to a twenty-third aspect, a computer readable medium is provided, and the computer readable medium stores program code. When the computer program code runs on a computer, the computer is enabled to perform the method in any one of the first aspect to the ninth aspect and the possible implementations of the first aspect to the ninth aspect.

According to a twenty-fourth aspect, a chip is provided, including a processor and a memory. The memory is configured to store a computer program, and the processor is configured to invoke the computer program from the memory and run the computer program. The computer program is used to implement the method in any one of the first aspect to the ninth aspect and the possible implementations of the first aspect to the ninth aspect.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

Figure 1:
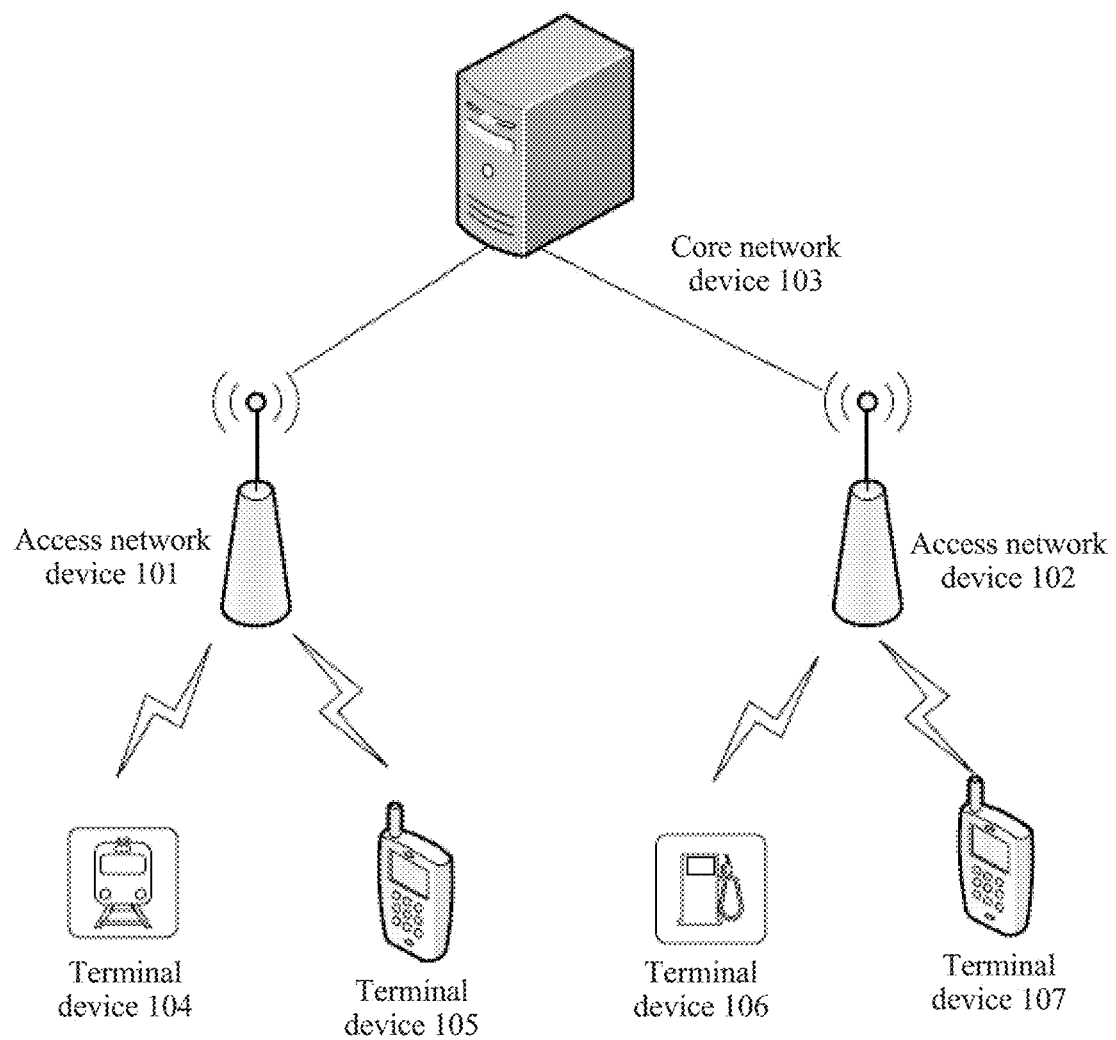
FIG. 1 is a possible schematic diagram of a communications system architecture according to an embodiment of the present invention.

The following describes the embodiments of the present invention with reference to the accompanying drawings in the embodiments of the present invention.

Network elements in the embodiments of the present invention are described as follows:

A terminal device may be user equipment (UE), and the UE implements an access network side by using an access network device. For example, the terminal device may be a handheld terminal device, a notebook computer, a subscriber unit (a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, or another device that can access a network. The terminal device and the access network device communicate with each other by using an air interface technology.

An access network (RAN) device is mainly responsible for radio resource management, quality of service (QoS) management, data compression and encryption, and other functions on an air interface side. The access network device may include various forms of base stations, for example, a macro base station, a micro base station (also referred to as a small cell), a relay node, and an access point. In systems in which different radio access technologies are used, a device with a base station function may have different names. For example, the device is referred to as a gNB in a 5th generation (5G) system, is referred to an evolved NodeB (eNB or eNodeB) in an LTE system, or is referred to as a NodeB ( ) in a 3rd generation (3G) system.

A core network device is configured to provide a user connection and perform user management and service carrying. For example, user connection establishment includes functions such as mobility management (MM) and paging. User management includes user description, QoS, and security (corresponding security measures provided by an authentication center include security management of a mobile service and security processing on external network access). A bearer connection includes an external public switched telephone network (PSTN), an external circuit data network, a packet data network, the Internet, and the like.

For example, the core network device may include an access and mobility management function (AMF) network element, and is mainly responsible for signaling processing, that is, control plane functions including access control, mobility management, attachment and detachment, and other functions.

Optionally, the core network device may further include a session management function (SMF) network element, and is responsible for session management functions, such as session setup, session modification, and session release.

Optionally, the core network device may further include a user plane function (UPF) network element, and is responsible for forwarding and receiving user data in the terminal device. The UPF network element may receive user data from a data network, and transmit the user data to the terminal device by using the access network device. The UPF network element may further receive user data from the terminal device by using the access network device, and forward the user data to the data network. A resource transmission and scheduling function for serving the terminal device in the UPF network element is managed and controlled by the SMF network element. The core network device in the embodiments of the present invention is not limited to the AMF network element, the SMF network element, and the UPF network element.

Referring to FIG. 1, FIG. 1 is a possible schematic diagram of a communications system architecture used in an embodiment of the present invention. As shown in FIG. 1, it can be seen that an access network device may be connected to at least one terminal device. For example, an access network device 101 is connected to both a terminal device 104 and a terminal device 105, and an access network device 102 is connected to both a terminal device 106 and a terminal device 106. The access network device may be connected to at least one core network device 103. For example, both the access network device 101 and the access network device 102 are connected to the core network device 103.

There is a control plane interface between the core network device and the access network device. For example, an interface exists between the core network device and the access network, and is referred to as an N2 interface or an NG interface in this application.

For example, if a communications interface such as an Xn interface exists between the access network device 101 and the access network device 102 in FIG. 1, the access network device 101 and the access network device 102 can communicate with each other; if no communications interface exists between the access network device 101 and the access network device 102 in FIG. 1, the access network device 101 and the access network device 102 cannot communicate with each other. Therefore, the access network device 101 and the access network device 102 can respectively transmit, only when there is a communications interface, information about network slices supported by the access network device 101 and the access network device 102. If there is no communications interface, the access network device 101 and the access network device 102 cannot communicate with each other, and further cannot respectively send the information about the network slices supported by the access network device 101 and the access network device 102.

The core network device 103 may include at least one AMF network element, and optionally may further include an SMF network element and a UPF network element. The access network device 102 may be connected to one or more AMF network elements. One AMF network element can support one or more network slices of different types, and types of network slices supported by different AMF network elements may be different. Each SMF can support one or more network slices of different types, and types of network slices supported by different SMF network elements may be different. One AMF network element may establish a communication connection to a plurality of SMF network elements. Optionally, one SMF network element may be connected to a plurality of AMF network elements. In addition, one SMF network element may be connected to a plurality of UPF network elements, and one UPF network element may be connected to one SMF network element. In this case, one SMF network element can manage and control a plurality of UPF network elements, and one UPF network element is managed and controlled by one SMF. The UPF network element may establish a connection to the access network device, to implement data transmission of the terminal device.

Figure 2:
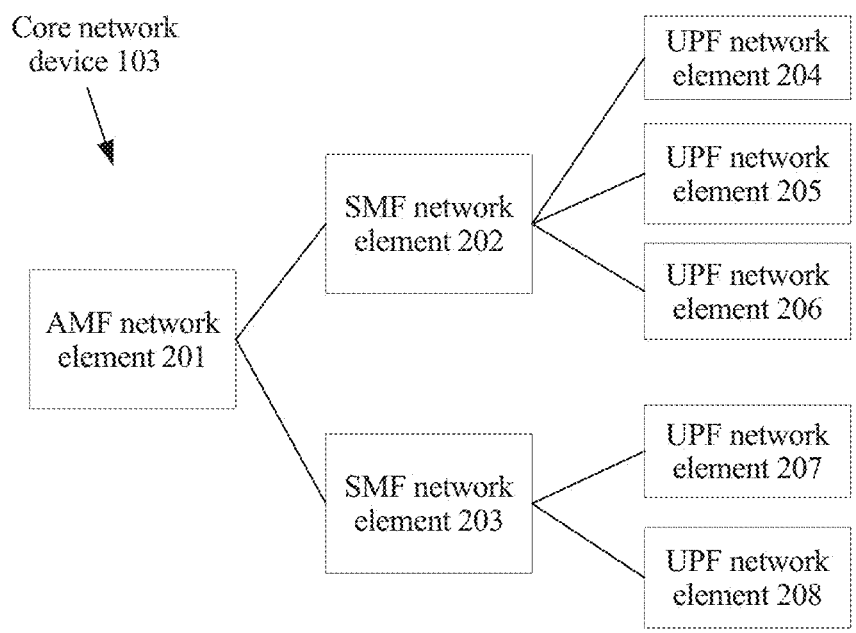
FIG. 2 is a possible schematic diagram of a core network device according to an embodiment of the present invention.

For example, referring to FIG. 2, FIG. 2 is a possible schematic diagram of a core network device according to an embodiment of the present invention. One AMF network element 201 establishes a connection to two SMF network elements: an SMF network element 202 and an SMF network element 203. Network slice types supported by the AMF network element 201 include a network slice type 1 and a network slice type 2. The network slice type 1 is a type of network slice 1, and the network slice type 2 is a type of network slice 2. The SMF network element 202 is an SMF network element corresponding to the network slice 1, and the SMF network element 203 is an SMF network element corresponding to the network slice 2. One SMF network element can manage and control a plurality of UPF network elements. For example, the SMF network element 202 manages a UPF network element 204, a UPF network element 205, and a UPF network element 206, and the SMF network element 203 manages a UPF network element 204 and a UPF network element 208.

Because there are a plurality of types of services in a terminal device, such as an enhanced mobile broadband (eMBB) service, ultra-reliable and low latency communications URLLC), and massive machine type communications (mMTC), network slices corresponding to different types of service sessions may be different. Due to different provided operators or service providers, a same service type may correspond to different network slices. Different access network devices can support different network slices. In this case, if the terminal device needs to access a network and establish a plurality of sessions, an access network device connected to the terminal device needs to support network slices corresponding to all sessions or some sessions in the terminal device.

Handover to an access network device needs to be performed for the terminal device due to movement of a location of the terminal device, load balance, or the like. For example, with reference to FIG. 1, a session of a terminal device 104 needs to be handed over from an access network device 101 to another access network device 102. However, whether the handover succeeds is closely related to whether the access network device 102 supports a network slice corresponding to the session of the access network device 104. In actual, the access network device 101 sends a handover request to the access network device 102, but some sessions usually cannot be handed over to the access network device 102. There are many reasons that a session cannot be handed over to the access network device 102. For example, a radio resource in the access network device 102 is not available or a requested network slice is not supported. However, in an existing solution, the access network device 101 cannot determine a reason that the session cannot be handed over to the access network device 102. If a resource for a first network slice corresponding to the requested session in the access network device 102 is not available, the access network device 101 still sends the handover request to the access network device 102 when another session needs to be handed over to the first network slice, and a case in which the session cannot be handed over to the access network device 102 still occurs. This reduces a handover success rate.

In this embodiment of the present invention, after the access network device 101 sends the handover request to the access network device 102, the access network device 101 can obtain cause information of a session, which is rejected due to a network slice of the access network device 102, to help provide information for another session that needs to be requested to be handed over to the access network device 102. When a session corresponding to the same network slice needs to be handed over from the access network device 101, the access network device 101 may directly determine whether the session can be handed over to the access network device 102, thereby increasing a handover success rate. The access network device 101 can further select a better target base station for another terminal device to be handed over for handover.

It should be noted that an example in which the access network device is a base station is used for description in the embodiments of this application. In any embodiment of this application, in an optional manner, information about a supported network slice of a base station may include an identifier of at least one cell of the base station and indication information of at least one network slice corresponding to each cell identifier. One base station may cover one or more cells. Each cell is indicated by using a cell identifier, and each cell can support one or more network slices. Each cell supports a different network slice, and such a cell identifier may correspond to indication information of at least one network slice. For example, a specific representation form is shown below (a name is merely an example, and the name is not limited in the embodiments of this application). A cell ID represents a cell identifier, an S-NSSAI list represents indication information of a network slice, and one cell ID may correspond to at least one S-NSSAI list.

>>>Cell ID
>>>S-NSSAI list

Alternatively, in another optional manner, information about a supported network slice of a base station may include information about the base station and indication information of at least one network slice corresponding to the base station. Each base station can support one or more network slices, and therefore information about one base station may correspond to indication information of at least one network slice. For example, a specific representation form is shown below (a name is merely an example, and the name is not limited in the embodiments of this application). A gNB ID represents the information about the base station, an S-NSSAI list represents indication information of a network slice, and one gNB ID may correspond to at least one S-NSSAI list.

>>>gNB ID
>>>S-NSSAI list

Alternatively, in another optional manner, information about a supported network slice of a base station may include indication information of at least one network slice corresponding to a tracking area (TA) or a registration area (RA) to which a cell of the base station belongs. Each TA/RA can support one or more network slices, and therefore information about one TA/RA may correspond to indication information of at least one network slice. For example, a specific representation form is shown below (a name is merely an example, and the name is not limited in the embodiments of this application). A tracking area identity (TAI), a registration area identity (RAI), a tracking area code (TAC), or a registration area code (RAC) is used to represent information about a TA/RA, an S-NSSAI list represents indication information of a network slice, and one TAI/RAI/TAC/RAC may correspond to at least one S-NSSAI list.

>>>TAI/RAI/TAC/RAC
>>>S-NSSAI list

Information about the base station in any embodiment of this application may include at least one of a base station identity of the base station, a central unit identity (ID) of the base station, a distributed unit identity of the base station, a physical cell identifier (PCI) of the base station, and a cell global identity (CGI) of the base station.

It should be further noted that, indication information of each network slice in any embodiment of this application may include at least one of a network slice identifier, single network slice selection assistance information (S-NSSAI), and RAN network slice selection assistance information (R-NSSAI).

The network slice identifier may be represented by using at least one of the following (1) to (7):

(1) Network slice type information. For example, the network slice type information may indicate a network slice type such as an enhanced mobile broadband service, ultra-reliable and low latency communications, or massive machine type communications. Optionally, the network slice type information may indicate an end-to-end network slice type including a RAN-core network (CN) network slice type, or may indicate a RAN side network slice type or a CN side network slice type.

(2) Service type information related to a specific service. For example, the service type information may indicate a service feature such as a video service, an Internet of Vehicles service, or a voice service, or information about a specific service.

(3) Tenant information, used to instruct to create or rent client information of the network slice, such as Tencent or State Grid.

(4) User group information, used to instruct to group users based on a feature such as a user level.

(5) Slice group information, used to instruct to group network slices based on a feature. For example, the feature includes that all network slices that can be accessed by the terminal device may be used as a slice group. Or, a network slice group can be determined according to another criterion.

(6) Network slice instance information, used to indicate an identifier and feature information of an instance created for the network slice. For example, an identifier indicating a network slice instance may be allocated to the network slice instance, or a new identifier may be mapped on the basis of a network slice instance identifier and is associated with the network slice instance. A receiving side may identify, based on the identifier, the specific network slice instance indicated by the identifier.

(7) Dedicated core network (DCN) identifier. The identifier is used to uniquely indicate a dedicated core network in a Long Term Evolution (LTE) system or an enhanced LTE (eLTE) system, for example, a dedicated core network in the Internet of Things. Optionally, mapping may be performed on the DCN identifier and the network slice identifier, the DCN identifier may be mapped to the network slice identifier, and the network slice identifier may also be mapped to the DCN identifier.

The S-NSSAI includes at least slice/service type (SST) information, and optionally, may further include slice differentiator (SD) information. The SST information is used to indicate a behavior of a network slice, for example, a feature and a service type of the network slice. The SD information is complementary information of the SST. If the SST indicates implementation of a plurality of network slices, the SD may correspond to a unique network slice instance.

The R-NSSAI represents a set of specific S-NSSAI, that is, an identifier of a set of specific S-NSSAI.

It should be understood that, in the embodiments of this application, indication information of a network slice may be represented by using at least one of the foregoing parameters. For example, the indication information of the network slice may be represented by using a network slice type, or may be represented by using a network slice type and a service type, or may be represented by using a service type and tenant information. This is not limited in the embodiments of this application. How the indication information of the network slice is represented is not described in detail below. Optionally, a specific coding format of the indication information of the network slice is not limited. Different fields that may be carried in an interface message between different devices represent indication information of different network slices or may be replaced with abstracted index values, and different index values correspond to different network slices. Certainly, another identifier may be included in addition to the foregoing identifiers, and this is not limited herein. It should be understood that, if the terminal device, the access network device, or the core network device supports a plurality of network slices, indication information of a supported network slice of the terminal device, the access network device, or the core network device may be represented in a list form of the foregoing at least one identifier.

It should be noted that "there is a communications interface" or "there is an interface" in the embodiments of the present invention indicates that a communications interface is established and that the communications interface is available; and that "there is no communications interface" or "there is no interface" indicates that no communications interface is established or an established communications interface is unavailable. The communications interface herein is not limited to a communications interface between access network devices and a communications interface between the access network device and the core network device.

The embodiments of the present invention can be applied to another communications system that supports a network slice. The terms "system" and "network" can be interchanged with each other. A system architecture described in the embodiments of the present invention is intended to describe the technical solutions in the embodiments of the present invention more clearly, and do not constitute any limitation on the technical solutions provided in the embodiments of the present invention. A person of ordinary skill in the art may know that, with evolution of the system architecture, the technical solutions provided in the embodiments of the present invention are also applicable to similar technical problems.

Figure 3:
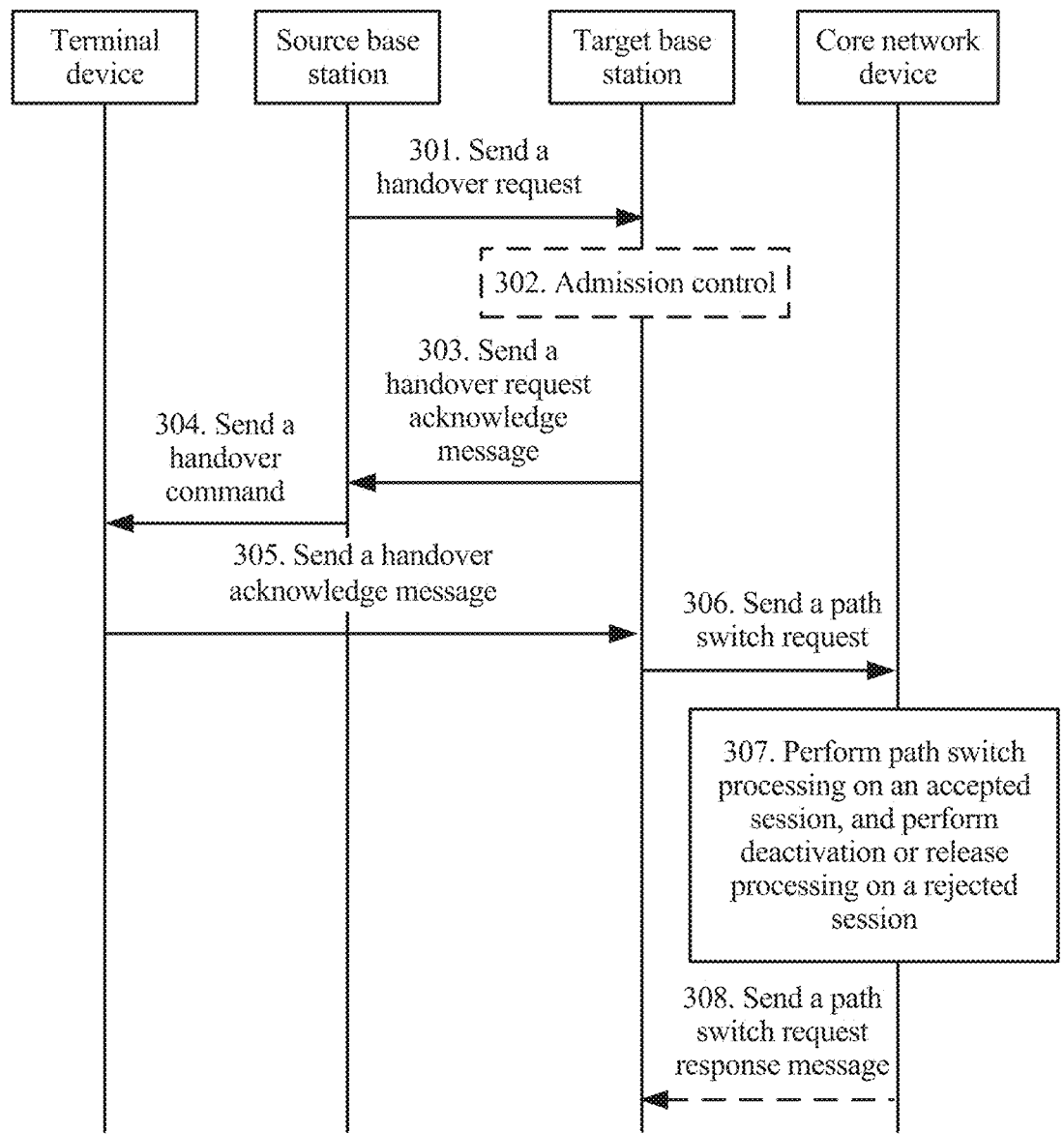
FIG. 3 is a schematic flowchart of a communication method according to an embodiment of the present invention.

Referring to FIG. 3, FIG. 3 shows a communication method according to an embodiment of the present invention. In this embodiment, an example in which an access network device is a base station is used for description. As shown in FIG. 3, the communication method relates to a terminal device, a source base station, a target base station, and a core network device. FIG. 3 is corresponding to a communication method used when the target base station determines that handover succeeds. The source base station is a base station that currently establishes a communication connection to the terminal device, and the target base station is a base station to which a session of the terminal device is requested to be handed over.

As shown in FIG. 3, the communication method includes step 301 to step 307. For details, refer to the following specific descriptions.

301. The source base station sends a handover request to the target base station.

There is a communications interface such as an Xn interface between the source base station and the target base station. In that case, the source base station and the target base station can communicate with each other. The handover request is used to request to hand over the session of the terminal device from the source base station to the target base station. The handover request includes an identifier of a session requested to be handed over and indication information of a network slice corresponding to the session. For example, if there are a plurality of sessions requested to be handed over, the handover request carries indication information of a network slice corresponding to each session. Correspondingly, the target base station receives the handover request.

Optionally, the session requested to be handed over may be an activated session of the terminal device, and may be understood as a session currently being performed in the terminal device. For example, the session of the terminal device includes a session A1, a session A2, a session A3, a session A4, and a session A5. The session A1, the session A2, and the session A3 are in an active state, and the session A4 and the session A5 are in a deactivated state. In this case, the handover request includes identifier of the session A1, identifier of the session A2, identifier of the session A3, indication information of network slice corresponding to the session A1, indication information of network slices corresponding to the session A2, and indication information of network slices corresponding to the session A3. A deactivated session does not need to be handed over to the target base station, and therefore signaling transmission can be reduced.

Optionally, before sending the handover request, the source base station may further determine, based on obtained information about a supported network slice of the target base station and the obtained indication information of the network slice corresponding to the session requested to be handed over, a specific session that is in the session requested to be handed over and whose corresponding network slice is supported by target base station and a specific session that is in the session requested to be handed over and whose network slice is not supported by the target base station. Still further, if network slices corresponding to all sessions requested to be handed over are not supported by the target base station, the source base station may not send the handover request to the target base station.

Optionally, the session requested to be handed over may be a first session and a second session of the terminal device. A network slice corresponding to the first session is supported by the target base station, and a network slice corresponding to the second session is not supported by the target base station. Because there is a communications interface between the source base station and the target base station, the source base station may determine, by interacting with the target base station, another base station, a core network side, or the like, the supported network slice of the target base station. Further, the source base station may classify, based on the indication information of the network slice corresponding to each session requested to be handed over and the supported network slice of the target base station, the sessions requested to be handed over, to obtain the first session and the second session. For example, the sessions requested to be handed over include a session B1, a session B2, and a session B3, the target base station supports network slices corresponding to the session B1 and the session B2, but the target base station does not support a network slice corresponding to the session B3. In this case, identifiers of the sessions requested to be handed over are classified into two types and are sent to the target base station. One type is an identifier of the first session, and the other type is an identifier of the second session. Therefore, the target base station can directly determine a session that is not supported by the target base station, thereby improving efficiency of determining a handover response message. Certainly, special classification processing may not be performed on all sessions that need to be handed over.

Optionally, the session requested to be handed over may be a first session of the terminal device, and a network slice corresponding to the first session is supported by the target base station. Therefore, for sessions corresponding to network slices that are not supported by the target base station, the target base station does not need to determine whether a network slice corresponding to the session requested to be handed over is supported, and may directly determine, based on a resource use status of a network slice of the target base station, whether to hand over the first session. In this case, the target base station does not need to perform admission control on a second session, thereby saving processing time for performing admission control on the second session.

Optionally, the source base station selects one of a plurality of base stations that have a communications interface with the source base station as the target base station. Further, the determined target base station supports network slices corresponding to all or some sessions requested to be handed over, so that a handover failure caused because the target base station does not support network slices of all the sessions requested to be handed over is avoided. A quantity of handover failures is reduced, to increase a handover success rate.

Optionally, if the source base station receives a measurement report sent by the terminal device, the source base station may select the target base station based on the measurement report, and perform step 301 to send the handover request to the target base station. The measurement report includes a measurement report value of at least one of a cell and a base station. Optionally, if the measurement report includes a measurement report value of the cell, the included cell may be a cell of the source base station or a cell of another base station. If the measurement report includes a measurement report value of the base station, the included base station may be the source base station or another base station. Optionally, a quantity of cells and a quantity of base stations included in the measurement report are not limited in this embodiment of the present invention.

302. The target base station performs admission control based on a factor such as a network slice support status, a resource use status, or the handover request.

The target base station performs admission control if the target base station receives the handover request sent by the source base station. Optionally, the target base station determines a handover response message based on a factor such as the indication information of the network slice corresponding to each session in the handover request, a support status of the target base station, or a resource use status.

For example, for a session B4, if the information about the supported network slice of the target base station includes indication information of a network slice corresponding to the session B4, it indicates that the target base station supports the network slice corresponding to the session B4. If the information about the supported network slice of the target base station does not include the indication information of the network slice corresponding to the session B4, it indicates that the target base station does not support the network slice corresponding to the session B4. In this case, the session B4 is a rejected session. Further, when the target base station supports the network slice corresponding to the session B4, if the target base station can further allocate a resource for the corresponding network slice to the session B4, the target base station determines that the session B4 is an accepted session. If the target base station cannot allocate the resource for the corresponding network slice to the session B4, the target base station determines that the session B4 is a rejected session. In this way, the target base station can determine the handover response message through admission control.

Optionally, even if only the first session is carried in step 301, the target base station may check indication information of the network slice corresponding to the first session (one or more sessions) to determine whether the network slice corresponding to the first session is currently supported.

Further, the handover response message may be a handover request acknowledge message, or the handover response message is a handover failure message. In the embodiment shown in FIG. 3, a case in which the handover response message is a handover request acknowledge message is described. In this case, the session requested to be handed over includes a session that can be handed over to the target base station and a session that is rejected by the target base station. The session may be rejected by the target base station because the target base station does not support a network slice corresponding to the rejected session, or because a resource for the network slice, corresponding to the rejected session, of the target base station is not available. Therefore, the handover request acknowledge message includes reject indication information, and the reject indication information is used to indicate cause information corresponding to a session, which is rejected by the target base station due to a network slice, from the session requested to be handed over. The cause information is that: the target base station does not support the network slice corresponding to the rejected session, or a resource is not available for a network slice being supported by the target base station and corresponding to the rejected session.

Optionally, the cause information in this embodiment of the present invention may be indicated by using an information element (IE), a flag, a cause value (cause), or the like, and this is not limited in this embodiment of the present invention.

For example, if the session requested to be handed over includes the first session and the second session, the cause information of the rejected session may be: the target base station does not support the network slice corresponding to the rejected session, or a resource is not available for a network slice being supported by the target base station and corresponding to the rejected session. If the session requested to be handed over includes the first session, the cause information for the rejected session of the base station is that: the resource is not available for the network slice, where the network slice is corresponding to the rejected session. If the first session includes a plurality of data flows and at least one data flow of the first session is admitted by the target base station and at least one data flow is rejected by the target base station, indication information indicating a reason for rejecting the at least one data flow of the first session may be carried. For example, the reason includes: a resource is not available or a resource for the network slice corresponding to the first session is not available in the target base station. The data flow is a traffic flow or a QoS flow.

303. The target base station sends a handover request acknowledge message to the source base station.

The handover request acknowledge message includes an identifier of an accepted session, an identifier of a rejected session, and cause information corresponding to the rejected session. For example, the handover request acknowledge message may be handover acknowledge or handover request acknowledge.

For example, referring to Table 1, Table 1 is a PDU session release list or a PDU session reject list. The identifier of the rejected session and the cause information corresponding to the rejected session that are included in the handover request acknowledge message may be represented in Table 1.

TABLE 1

| PDU session release list/PDU session reject list (PDU sessions to release list/PDU sessions not admitted list) |
|---|
| >PDU session identifier<br>>Cause value |

Optionally, the handover request acknowledge message further includes retransmission indication information corresponding to the rejected session. The retransmission indication information is used to indicate whether the terminal device is allowed to route, to a supported network slice of the target base station, a data flow of the rejected session. For example, the rejected session is the session B1 and the session B1 corresponds to a network slice 1. Cause information of the rejected session B1 may be that: the target base station does not support the network slice 1 corresponding to the session B1, or the target base station supports the network slice 1 but a resource for the network slice 1 is not available. Regardless of a reason for rejecting the session B1, if the target base station supports a network slice 2, and a data flow of the session B1 is routed to the network slice 2, data transmission can also be implemented. In this case, the target base station determines that retransmission indication information corresponding to the session B1 is: the terminal device is allowed to route the data flow of the session B1 to the network slice 2 supported by the target base station. It can be understood that, the retransmission indication information may not indicate a specific network slice to which the data flow is routed. In addition, if a network slice to which the data flow of the session B1 can be routed does not exist in the target base station, or the target base station cannot meet a QoS requirement of the data flow of the session B1, the target base station determines that the retransmission indication information corresponding to the session B1 is: the terminal device is not allowed to route the data flow of the session B1 to the supported network slice of the target base station. It can be understood that the retransmission indication information and the cause information may be identified by using an IE/flag/cause value. The IE/flag/cause value indicates a rejection cause of a session and also indicates that a data flow corresponding to the rejected session can be routed to another network slice. To be specific, a session may be re-established on another supported network slice of the target base station to transmit the data flow. The retransmission indication information and the cause information may be identified by using two different IEs/flags/cause values.

Optionally, the handover request acknowledge message further includes an identifier of a rejected bearer or an identifier of a rejected data flow of the session requested to be handed over. One session includes a plurality of data flows. One bearer may correspond to a plurality of data flows. A rejected bearer may be a bearer included in an accepted session or may be a bearer included in a rejected session. A rejected data flow may be a data flow of an accepted session or may be a data flow of a rejected session. For example, at least one bearer of the accepted session is a rejected bearer, and at least one data flow of the accepted session is a rejected data flow. A rejected bearer or a rejected data flow is sent to the source base station by using the handover request acknowledge message, so that the source base station can acknowledge the rejected bearer or the rejected data flow.

For example, if the handover request acknowledge message further includes the identifier of the rejected data flow, referring to Table 2, Table 2 includes the identifier of the accepted session, cause information of the rejected data flow, and the identifier of the rejected data flow. A list of accepted sessions may be represented as a PDU session admitted list or a PDU session handover list (PDU Sessions Subject to Forwarding List).

TABLE 2

| List of accepted sessions |
| --- |
| >PDU session identifier |
| >Cause value |
| >Identifier/identifier list of a rejected data flow (traffic/QoS flow ID (list)) |

For example, the foregoing information included in the handover request acknowledge message may be fed back in a list form. The session requested by the source base station to be handed over includes the first session and the second session, and the handover response message is determined as the handover request acknowledge message. An example in which the first session includes a session C1, a session C2, and a session C3, and the second session includes a session D1 and a session D2 is used for description. The session that is accepted by the target base station includes the session C1 and the session C2, and the session that is rejected by the target base station includes the session C3, the session D1, and the session D2. The target base station supports a network slice corresponding to the session C3, but handover fails because a resource for the network slice is not available. At least one bearer or data flow of the accepted session C1 is rejected.

In this case, referring to Table 3, Table 3 is a list form of accepted sessions according to an embodiment of the present invention. Cause information corresponding to the session C1 including the rejected bearer/data flow may be included in the handover request acknowledge message. The cause information is used to indicate cause information of at least one rejected bearers or at least one rejected data flows. For example, cause information R3 of at least one rejected bearer or at least one rejected data flow may be no resource available, an invalid QoS combination corresponding to a data flow of the session, multiple data flow identifier, or the like. Retransmission indication information corresponding to the session C1 including the rejected bearer/data flow may be further included in the handover request acknowledge message. A meaning represented by the retransmission indication information is the same as that of the foregoing content. Retransmission indication information Y indicates that the terminal device is allowed to route the rejected data flow of the session C1 to the supported network slice of the target base station. Therefore, more accurate information can be provided for next handover. A handover success rate is increased. An identifier of the rejected bearer/data flow, the retransmission indication information, and the cause information may be optionally carried in the handover request acknowledge message. A list of acknowledged sessions may be represented as a PDU session admitted list or a PDU session handover list (PDU Sessions Subject to Forwarding List).

TABLE 3

| | Session identifier | Identifier of a rejected bearer/data flow | Cause information | Retransmission indication information |
| --- | --- | --- | --- | --- |
| List of accepted sessions | Session C1 | Identifier of at least one rejected bearer/data flow | R3 | Y |
| | Session C2 | Null (indicating that identifiers of all bearers/QoS flows are accepted) | Null | Null |

Further, referring to Table 4, Table 4 is a list form of rejected sessions according to an embodiment of the present invention. The identifier of the rejected bearer/data flow and the retransmission indication information may be optionally carried in the handover request acknowledge message. Cause information of the session C3 is R1, indicating that the target base station supports a network slice corresponding to the session C3 but a resource for the network slice is not available. Cause information of the session D1 and cause information of the session D2 are R2, indicating that the target base station does not support a network slice corresponding to the session D1 or a network slice corresponding to the session D2. Y in the retransmission indication information indicates that the terminal device is allowed to route a data flow of the session C3 to the supported network slice of the target base station. N in the retransmission indication information indicates that the terminal device is not allowed to route data flows of the session D1 and the session D2 to the supported network slice of the target base station. A list of rejected sessions may be represented as a PDU session release list (PDU Sessions to Release List) or a PDU session reject list (PDU sessions Not Admitted List).

TABLE 4

| | Session identifier | Identifier of a rejected bearer/data flow | Cause information | Retransmission indication information |
|---|---|---|---|---|
| List of rejected sessions | Session C3 | Identifiers of all bearers/data flows of the session C3 | R1 | Y |
| | Session D1 | Identifiers of all bearers/data flows of the session D1 | R2 | N |
| | Session D2 | Identifiers of all bearers/data flows of the session D2 | R2 | N |

In addition, it can be obtained that in Table 4, the list is generated based on each session identifier. In another optional manner, the list may be generated based on the cause information. As shown in Table 5, Table 5 is another list form of sessions that are rejected according to an embodiment of the present invention. In this case, one piece of cause information corresponds to a plurality of session identifiers, thereby reducing signaling transmission. The identifier of the rejected bearer/data flow and the retransmission indication information may be optionally carried in the handover request acknowledge message. A list of rejected sessions may be represented as a PDU session release list or a PDU session reject list.

TABLE 5

| | Cause information | Session identifier | Identifier of a rejected bearer/data flow | Retransmission indication information |
|---|---|---|---|---|
| List of rejected sessions | R1 | Session C3 | Identifiers of all bearers/data flows of the session C3 | Y |
| | R2 | Session D1 | Identifiers of all bearers/data flows of the session D1 | N |
| | | Session D2 | Identifiers of all bearers/data flows of the session D2 | N |

Optionally, the handover request acknowledge message further carries bearer configuration information determined by the target base station, and the bearer configuration information is used to instruct the terminal device to perform bearer configuration based on the configuration information.

Further, optionally, the handover request acknowledge message further includes full configuration handover indication information. The full configuration handover indication information is used to indicate that the terminal device does not need to modify each original bearers. Full configuration handover may be performed by using the bearer configuration information determined by the target base station. To be specific, all original bearer configurations are deleted and the bearer configuration information determined by the target base station is stored, to improve bearer configuration efficiency. Optionally, if the handover request includes the full configuration handover indication information, the handover request acknowledge message further includes the full configuration handover indication information.

Optionally, the handover request acknowledge message further includes the information about the supported network slice of the target base station. This helps the target base station notify the source base station of information about a network slice currently supported by the target base station, thereby reducing interaction between the source base station and the target base station.

Correspondingly, the source base station receives the handover request acknowledge message sent by the target base station.

304. The source base station sends a handover command to the terminal device.

The source base station sends the handover command to the terminal device after the source base station receives the handover request acknowledge message sent by the target base station. For example, the handover command may be an RRC connection reconfiguration message or a handover command message. The handover command includes at least one of an identifier of an accepted session, an identifier of a data flow of the accepted session, and an identifier of a bearer corresponding to the accepted session, so as to notify the terminal device of a session, a data flow, or a bearer that can be handed over to the target base station.

Optionally, the handover command further includes the session that is rejected by the target base station and the retransmission indication information corresponding to the rejected session. Thus, the terminal device determines, based on the retransmission indication information corresponding to the rejected session, whether to initiate a session setup request to the target base station for the rejected session. Optionally, for a plurality of rejected sessions, the handover command may include retransmission indication information corresponding to each session, or the handover command may indicate retransmission allowed and retransmission not allowed. This is not limited in this embodiment of the present invention.

Optionally, if the handover request acknowledge message includes bearer configuration information determined by the target base station, the handover command further includes the bearer configuration information determined by the target base station, to instruct the terminal device to perform bearer configuration based on the configuration information. If the handover request acknowledge message further includes full configuration handover indication information, the handover command further includes the full configuration handover indication information, to improve bearer configuration efficiency.

Correspondingly, the terminal device receives the handover command sent by the source base station.

305. The terminal device sends a handover acknowledge message to the target base station.

For example, the handover acknowledge message may be a handover command complete message, or may be an RRC connection reconfiguration complete message.

Optionally, after the terminal device receives the handover command, random access is performed between the terminal device and the target base station, to feed back a handover acknowledge message to the target base station. The handover acknowledge message is used to indicate that the terminal device has completed handover.

306. The target base station sends a path switch request to the core network device.

The target base station sends the path switch request to the core network device when receiving the handover acknowledge message. For example, the path switch request is a path switch request. The path switch request includes the identifier of the session that is accepted by the target base station, so that the core network device performs path switching on the accepted session.

Optionally, the path switch request may further include the identifier of the session that is rejected by the target base station, so that the core network device performs releasing or deactivating on the rejected session.

Further, there are an activated service and a deactivated service in the terminal device, and the core network device stores all sessions of the terminal device. Both the accepted session and the rejected session belong to the activated service. The identifiers of such two sessions are carried in the path switch request, so that the core network device can determine a deactivated session from all stored sessions of the terminal device. In this way, the core network device does not need to deal with such sessions, and only needs to deal with the accepted session and the rejected session, thereby improving processing efficiency.

Optionally, the path switch request further includes indication information of the network slice corresponding to the session that is rejected by the target base station, so that the core network device can compare the network slice corresponding to the rejected session with a network slice that is supported by a target base station and that is stored in the core network device. Therefore, the core network device can obtain whether the session is rejected because the target base station does not support the network slice. If yes, the core network device subsequently triggers a process of releasing the session, to reduce storage space occupied by such sessions in the core network device. If no, the core network device may subsequently trigger a process of deactivating the session, so that the core network device can quickly resume the session when the session needs to be activated.

Optionally, the path switch request includes the cause information corresponding to the session that is rejected by the target base station. The cause information is carried, so that the core network device can perform different processing on sessions rejected for different causes.

Correspondingly, the core network device receives the path switch request sent by the target base station.

307. The core network device performs path switching on an accepted session, and performs deactivating or releasing a rejected session.

That the core network device performs deactivation processing on the rejected session is specifically suspending the rejected session. A context corresponding to the session may be stored in the core network device, so that the core network device can quickly resume the session when the session needs to be activated.

That the core network device performs releasing the rejected session is specifically: the core network device releases a context corresponding to the session. Tor example, an AMF network element instructs an SMF network element to release the context corresponding to the session, thereby reducing storage space occupied by such sessions in the core network device.

Optionally, the core network device may perform deactivating on the rejected session because a resource of the network slice of the target base station is not available, so that data transmission of the session can be resumed when the network slice of the target base station is available. In comparison with releasing performed on the session, time required by activation processing is shorter by re-establishing the session when the network slice of the target base station is not limited, so that data transmission of a deactivated session can be more quickly resumed.

Optionally, the core network device may perform releasing the session that is rejected because the target base station does not support the network slice. The supported network slice of the target base station does not change within short time, and therefore data transmission of the session cannot be resumed in short time. In this case, if deactivation processing is performed on the session, more storage space of the core network device is occupied, and storage space is wasted.

308. The core network device sends a path switch request response message to the target base station.

The core network device sends the path switch request response message to the target base station. The path switch request response message includes an identifier of a session for which path switch has been successfully completed. For example, the path switch request response message is path switch request ack or a path switch request response.

Optionally, the path switch request response message further includes an identifier of a session for which path switch fails, so that the target base station determines a path switch result of the core network device.

In this embodiment of the present invention, after the source base station sends the handover request to the target base station, the source base station can obtain the cause information of the session, that is rejected due to the network slice of the target base station, to help provide information for another session that needs to be requested to be handed over to the target base station. When a session corresponding to the same network slice needs to be handed over from the source base station, the source base station may directly determine whether the session can be handed over to the target base station, thereby increasing a handover success rate.

Figure 4:
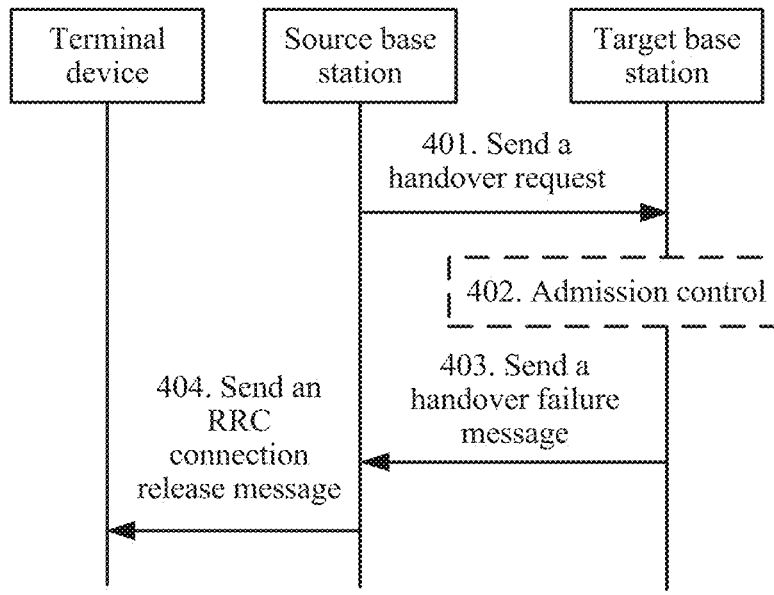
FIG. 4 is a schematic flowchart of another communication method according to an embodiment of the present invention.

Referring to FIG. 4, FIG. 4 shows a communication method according to an embodiment of the present invention. In this embodiment, an example in which an access network device is a base station is used for description. As shown in FIG. 4, the communication method relates to a terminal device, a source base station, and a target base station. FIG. 4 is corresponding to a communication method used when the target base station determines that handover fails. The source base station is a base station that currently establishes a communication connection to the terminal device, and the target base station is a base station to which a session of the terminal device is requested to be handed over.

As shown in FIG. 4, the communication method includes step 401 to step 404. For details, refer to the following specific descriptions.

401. The source base station sends a handover request to the target base station.

For step 401, refer to corresponding detailed descriptions of step 301 in the embodiment shown in FIG. 3. Details are not described herein again.

402. The target base station performs admission control based on a factor such as a network slice support status, a resource use status, or the handover request.

The target base station performs admission control if the target base station receives the handover request sent by the source base station. Optionally, the target base station determines a handover response message based on a factor such as indication information of a network slice corresponding to each session in the handover request, a support status of a network slice of the target base station, or a resource use status.

Further, the handover response message may be a handover request acknowledge message, or the handover response message is a handover failure message. In the embodiment shown in FIG. 4, a case in which the handover response message is a handover failure message is described. In this case, none of sessions requested to be handed over can be handed over to the target base station. Namely, the sessions requested to be handed over all are sessions rejected by the target base station. Handover of the session may be rejected by the target base station because the target base station does not support a network slice corresponding to the rejected session, or because a resource for the network slice, corresponding to the rejected session, of the target base station is not available. Therefore, the handover request acknowledge message includes reject indication information. The reject indication information is used to indicate cause information corresponding to a session, which is rejected by the target base station due to a network slice, from the session requested to be handed over. The cause information is that: the target base station does not support the network slice corresponding to the rejected session, or a resource is not available for a network slice being supported by the target base station and corresponding to the rejected session.

Optionally, the cause information in this embodiment of the present invention may be indicated by using an IE, a flag, a cause, or the like. This is not limited in this embodiment of the present invention.

For example, if the session requested to be handed over includes a first session and a second session, the cause information of the rejected session may be that: the target base station does not support the network slice corresponding to the rejected session, or the resource is not available for a network slice being supported by the target base station and corresponding to the rejected session. If the session requested to be handed over includes a first session, the cause information of the rejected session is that: the resource is not available for the network slice corresponding to the rejected session.

403. The target base station sends a handover failure message to the source base station.

The handover failure message includes the cause information corresponding to the rejected session. For example, the handover failure message is a handover preparation failure message.

Optionally, the handover failure message further includes an identifier of a rejected bearer or an identifier of a rejected data flow of the session requested to be handed over. One session includes a plurality of data flows, and one bearer corresponds to at least one data flow. The rejected bearer may be a bearer of the rejected session, and the rejected data flow may be a data flow of the rejected session. For example, all bearers of the rejected session are rejected bearers, and all data flows of the rejected session are rejected data flows. The ID of rejected bearer or rejected data flow is sent to the source base station by using the handover failure message, so that the source base station can acknowledge the rejected bearer or the rejected data flow.

Further, in this embodiment of the present invention, the handover failure message may be represented by using a list of rejected sessions. For the list, refer to all content in Table 4 and Table 5 except the retransmission indication information. The identifier of the rejected bearer/data flow is optional content of the handover failure message, and this is not limited in this embodiment of the present invention.

Optionally, if the handover response message is a handover failure message, the reject indication information may be used to indicate that the target base station does not support a network slice corresponding to any session of the terminal device. For example, if the session requested to be handed over includes the first session and the second session, and the source base station does not know a newly updated supported network slice by the target base station, it is likely that the target base station does not support any requested session. In this case, in an optional solution, the handover failure message includes the reject indication information (indicated by an IE, a flag, a cause, or the like) and an identifier of the rejected session. For example, in this case, referring to Table 6, the PDU session release list includes a handover rejection indication value. In another optional solution, the handover failure message includes the reject indication information. In this case, the PDU session release list in Table 6 does not need to be carried, and only a handover failure indication value is carried. In this way, the source base station determines a network slice that is not supported by the target base station.

TABLE 6

| PDU session release list |
| --- |
| Indication value (Indicator) |

Alternatively, the reject indication information may be used to indicate that the target base station supports a network slice corresponding to any session included in the handover request, and that the target base station refuses to hand over all sessions included in the handover request. For example, if the session requested to be handed over includes the first session, and a resource for a network slice of a target base station corresponding to each session requested to be handed over is not available, in an optional solution, the handover failure message includes the reject indication information (indicated by an IE, a flag, a cause, or the like); in another optional solution, the handover failure message includes the reject indication information (indicated by an IE, a flag, a cause, or the like) and the identifier of the rejected session, so that the source base station determines a resource use status of a network slice, corresponding to the session requested to be handed over, of the target base station.

Alternatively, the reject indication information may be used to indicate that the target base station supports a network slice corresponding to a third session but refuses to hand over the third session, and that the target base station does not support a network slice corresponding to a fourth session. The session requested to be handed over includes the third session and the fourth session. For example, when the source base station does not determine a supported network slice newly updated by the target base station, if the session requested by the source base station to be handed over includes the first session and the second session, or if the session requested by the source base station to be handed over includes the first session, the target base station may re-classify, based on the support status and the resource use status of the network slice of the target base station, the sessions requested to be handed over. To be specific, the source base station determines that the first session supported by the target base station may change to a session that is not supported by the target base station, and the source base station determines that the second session that is not supported by the target base station may change to a session that is supported by the target base station. Therefore, the third session in the reject indication information fed back by the target base station may be the same as or different from the first session in the handover request, and the fourth session in the reject indication information fed back by the target base station may be the same as or different from the second session in the handover request. Further, in this case, the target base station may classify sessions corresponding to a same handover rejection cause into one type of sessions and establish a correspondence between this type of sessions and one piece of reject indication information (indicated by an IE, a flag, a cause, or the like). Namely, the handover failure message includes two pieces of reject indication information and identifiers of sessions corresponding to the two pieces of reject indication information. Alternatively, the target base station may establish a correspondence between each rejected session and one piece of reject indication information (indicated by an IE, a flag, a cause, or the like). Namely, the handover failure message includes an identifier of at least one rejected session and reject indication information corresponding to each rejected session. Alternatively, the handover failure message includes two pieces of reject indication information. This is not limited in this embodiment of the present invention. Optionally, for a rejected session, due to a resource for a network slice of the target base station is not available, the identifier of the rejected session and the indication information of the network slice corresponding to the rejected session may be added to the handover failure message, to indicate, to the source base station, that a resource for such a network slice of the target base station is not available, without using additional indication information. In this way, the source base station can determine a resource use status of such a network slice in the target base station.

Alternatively, the reject indication information may be used to indicate that the target base station refuses to hand over a session. For example, when the session requested by the source base station to be handed over includes the first session and the second session, a resource for each network slice supported by the target base station is not available. In this case, the handover failure message includes one piece of reject indication information, indicating that the target base station not only rejects the session requested to be handed over, but also rejects handover of a session corresponding to another supported network slice. In this way, the source base station can obtain resource use statuses of all network slices in the target base station in a timely manner. This provides information for handover of another session in the source base station, thereby increasing a handover success rate.

Optionally, the handover failure message further includes information about the supported network slice of the target base station. This helps the target base station notify the source base station of information about a network slice currently supported by the target base station, thereby reducing interaction between the source base station and the target base station.

404. The source base station sends an RRC connection release message to the terminal device.

The source base station sends the RRC connection release message to the terminal device when determining that handover fails, so that the terminal device releases an RRC connection as soon as possible, to avoid a subsequent radio link failure, and reduce signaling overheads.

Optionally, the RRC connection release message includes indication information of a network slice supported by a neighboring cell of a source cell, indication information of a network slice supported by a TA/RA to which the neighboring cell of the source cell belongs, or information about a network slice supported by a neighboring base station of the source base station. The source cell is a cell serving the terminal device when the source base station requests handover to the target base station. In this way, the source base station obtains more network slices supported by another cell or another base station. This provides information for subsequent processing, and reduces interaction signaling for obtaining network slice information between a second base station and a neighboring base station of a first base station, thereby improving convenience of obtaining the information about the supported network slice of the base station.

Correspondingly, the terminal device receives the RRC connection release message, and releases an RRC connection.

In this embodiment of the present invention, after the source base station sends the handover request to the target base station, the source base station can obtain the cause information of the session, that is rejected due to the network slice of the target base station, to help provide information for another session that needs to be requested to be handed over to the target base station. When a session corresponding to the same network slice needs to be handed over from the source base station, the source base station may directly determine whether the session can be handed over to the target base station, thereby increasing a handover success rate.

Figure 5:
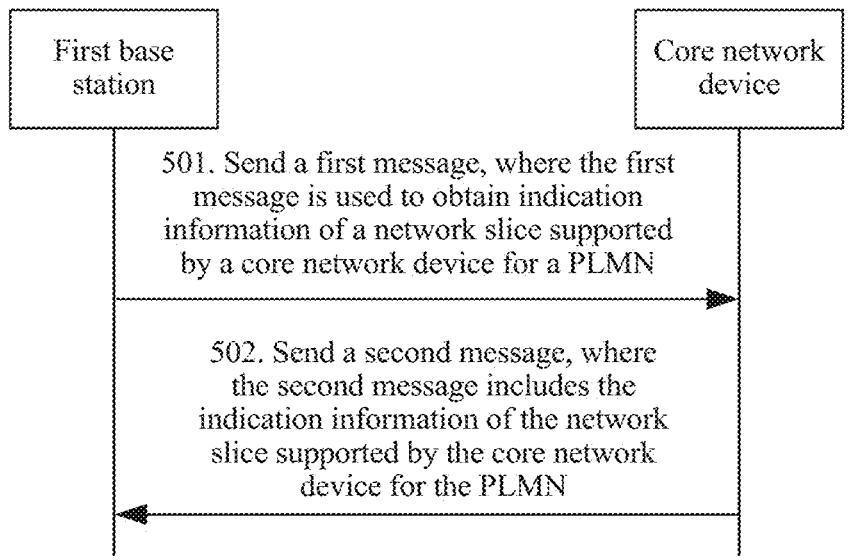
FIG. 5 is a schematic flowchart of another communication method according to an embodiment of the present invention.

Referring to FIG. 5, FIG. 5 shows another communication method according to an embodiment of the present invention. An example in which an access network device in the communication method is a base station is used for description. As shown in FIG. 5, the communication method relates to a first base station and a core network device. For details, refer to the following specific descriptions.

501. The first base station sends a first message to the core network device. The first message is used to obtain indication information of a supported network slice of the core network device for a PLMN.

The core network device may serve a plurality of public land mobile networks (PLMN). Different PLMN served by one core network device may support different network slices. If different core network devices serve a same PLMN, network slices supported by the different core network devices may be different. This is not limited in this embodiment of the present invention. For example, a first core network device may serve a first PLMN and a second PLMN. If the first core network device serves the first PLMN, the first core network device supports a network slice 1, a network slice 2, and a network slice 3. If the first core network device serves the second PLMN, the first core network device supports the network slice 1 and a network slice 4. A second core network device may serve the first PLMN. If the second core network device serves the first PLMN, the second core network device supports the network slice 1, the network slice 4, and a network slice 5.

Optionally, the first message carries an identifier of a PLMN, and therefore the core network device feeds back indication information of a supported network slice of the PLMN indicated by the identifier of the PLMN served by the core network device. Optionally, the PLMN Identity (PLMN ID) included in the first message could be part of the served PLMN of the first base station, or all of the served PLMN of the first base station.

Optionally, the first message does not carry an identifier of any PLMN, and therefore the core network device may feed back indication information of supported network slice for each PLMN served by the core network device. For example, if the core network device serves three PLMNs, the core network device sends, to the first base station, indication information of a supported network slice for each PLMN served by the core network device.

Correspondingly, the core network device receives the first message from the first base station.

502. The core network device sends a second message to the first base station. The second message includes indication information of a supported network slice for a PLMN served by the core network device.

A supported network slice of the core network device for serving different PLMNs may be preconfigured by a network management device. For example, the network management device is operation, administration and maintenance (OAM), and a supported network slice may be an updated network slice (for example, the OAM performs an update for a core network, or performs an update due to another cause). This is not limited in this embodiment of the present invention.

The first base station receives the indication information of the supported network slice for the PLMN served by the core network device, thereby helping provide information when the first base station selects a core network device for the terminal device, so as to more accurately select a core network device for a session of the terminal device.

For example, the terminal device accesses the first PLMN, and a network slice corresponding to a session that needs to be served by the core network device is the network slice 4. If the first core network device serves the first PLMN, the first core network device supports the network slice 1, the network slice 2, and the network slice 3. If the first core network device serves the second PLMN, the first core network device supports the network slice 1 and the network slice 4. If the second core network device serves the first PLMN, the second core network device supports the network slice 1, the network slice 4, and the network slice 5. If a supported network slice of the first core network device is not fed back at a PLMN granularity, the first core network device supports the network slice 1, the network slice 2, the network slice 3, and the network slice 4, and the second core network device supports the network slice 1, the network slice 4, and the network slice 5. Therefore, it is very likely that the first base station selects the first core network device to serve the session of the terminal device. However, the first core network device does not support the network slice 4 when the first core network device serves the first PLMN, and consequently a core network device selection error occurs. However, if the supported network slice of the core network device is fed back for each PLMN (namely, at the PLMN granularity), a case in which the first base station selects the first core network device for the session of the terminal device can be avoided, and accuracy of selecting a core network device for the session of the terminal device can be improved.

Correspondingly, the first base station receives the second message sent by the core network device.

Optionally, if the first message carries an identifier of a PLMN, the core network device may send, to the first base station, indication information of a supported network slice for the PLMN (indicated by the identifier of the PLMN) served by the core network device; or the core network device sends, to the first base station, indication information of a supported network slice for all PLMN(s) served by the core network device.

Optionally, if the first message does not carry an identifier of a PLMN, the core network device may feed back indication information of a supported network slice for each PLMN served by the core network device.

Optionally, there is no communications interface between the first base station and the core network device. For example, a communications interface between the first base station and the core network device is represented as N2 or NG. An N2 interface is used as an example. The first message sent by the first base station to the core network device may be an N2 interface setup request or a base station configuration update (for example, gNB configuration update) message. The first base station receives an N2 interface setup request failure message or a base station configuration update failure (for example, gNB configuration update failure) message from the core network device. The core network device may send, by using the N2 interface setup failure message or the update failure message, the indication information of the supported network slice for the PLMN served by the core network device. In this way, in a setup process, the first base station can also obtain the indication information of the supported network slice for the PLMN served by the core network device, thereby reducing interaction for obtaining the supported network slice, and increasing a speed of obtaining the indication information of the network slice. For another example, the first message sent by the first base station to the core network device is also an N2 interface setup request or a base station configuration update message. The first base station receives an N2 interface setup response message or a base station configuration update acknowledge (for example, gNB configuration update ACK) message from the core network device. The core network device may send, by using the N2 interface setup response message or a core network device configuration update acknowledge message, the indication information of the supported network slice for the PLMN served by the core network device. In this way, the first base station can obtain the indication information of the supported network slice of the PLMN served by the core network device, thereby improving convenience of obtaining the indication information of the network slice.

Optionally, there is a communications interface between the first base station and the core network device. For example, the first message is an obtaining request. The core network device may send, by using a response message, the indication information of the supported network slice of the PLMN served by the core network device. For another example, the first message sent by the first base station to the core network device may be a base station configuration update (for example, gNB configuration update) message. The first base station receives a base station configuration update failure (for example, gNB configuration update failure) message from the core network device. The core network device may send, by using the update failure message, the indication information of the supported network slice of the served PLMN of the core network device. For another example, if the first message sent by the first base station to the core network device is also a base station configuration update message, the first base station receives a base station configuration update acknowledge (for example, gNB configuration update ACK) message from the core network device. The core network device may send, by using a core network device configuration update acknowledge message, the indication information of the supported network slice of the PLMN served by the core network device. In this way, the first base station can obtain the indication information of the supported network slice of the PLMN served by the core network device, thereby improving convenience of obtaining the indication information of the network slice.

It should be understood that there is no necessary causality or sequence between step 501 and step 502. For example, step 502 may be independently implemented, provided that the core network device determines, before step 502, the indication information of the supported network slice for the PLMN served by the core network device. For example, the core network device may proactively implement step 502 when determining that the supported network slice of the served PLMN of the core network device is updated. In this case, the second message is an AMF configuration update message, to notify the first base station of indication information of an updated supported network slice for the PLMN served by the core network device.

It should be noted that, in this embodiment of the present invention, a PLMN served by the core network device may also be understood as a PLMN supported by the core network device, and this is not limited in this embodiment of the present invention.

In this embodiment of the present invention, the first base station may obtain, by using the core network device, the indication information of the supported network slice for the PLMN served by the core network device, and feed back, at the PLMN granularity, the supported network slice by the core network device, to improve accuracy of selecting, by the first base station, the core network device for the session of the terminal device.

Figure 6:
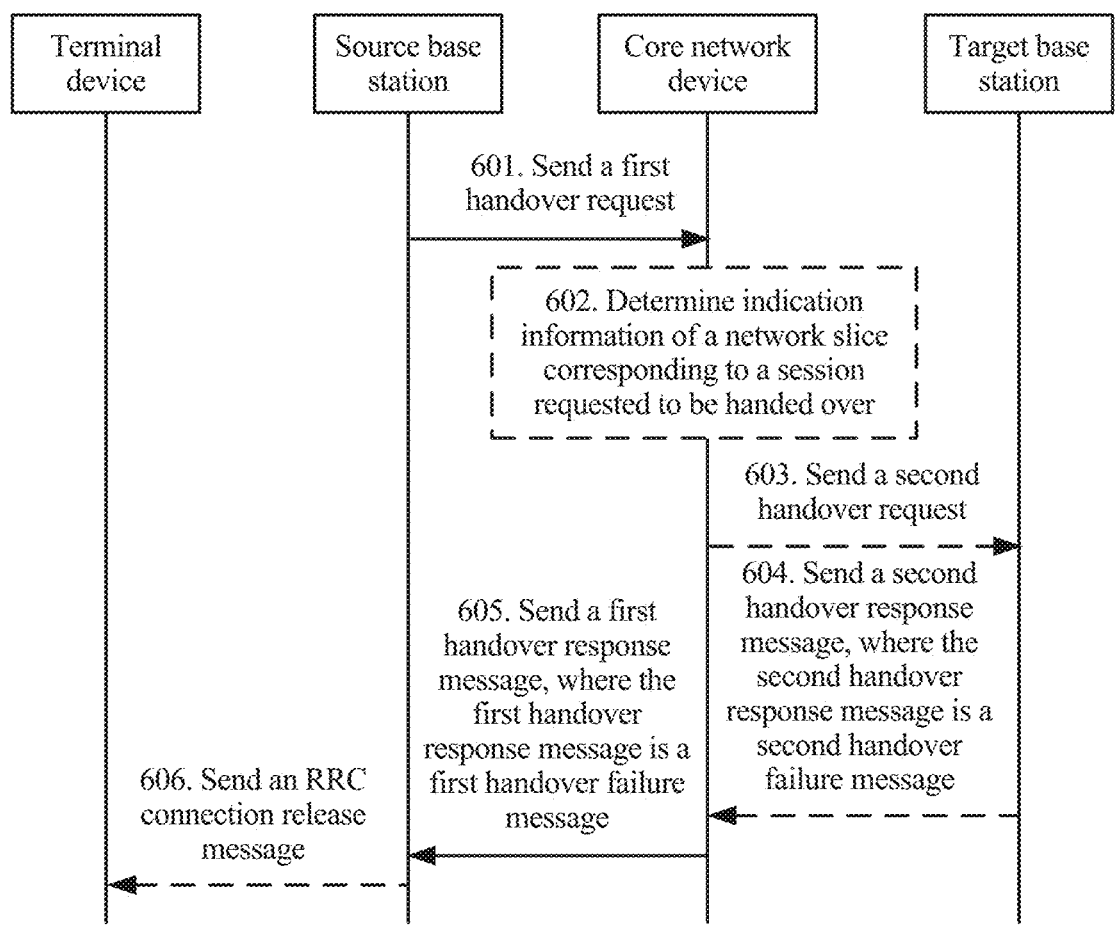
FIG. 6 is a schematic flowchart of another communication method according to an embodiment of the present invention.

Referring to FIG. 6, FIG. 6 shows another communication method according to an embodiment of the present invention. In this embodiment, an example in which an access network device is a base station is used for description. As shown in FIG. 6, the communication method relates to a terminal device, a source base station, a target base station, and a core network device. FIG. 6 is corresponding to a communication method used when the core network device determines that handover preparation fails. The source base station is a base station that currently establishes a communication connection to the terminal device. The target base station is a base station to which a session of the terminal device is requested to be handed over.

As shown in FIG. 6, the communication method includes step 601 to step 606. For details, refer to the following specific descriptions.

601. The source base station sends a first handover request to the core network device.

There is a communications interface such as an N2 interface or an NG interface between the source base station and the core network device. Therefore, the source base station and the core network device can communicate with each other. The first handover request is used to request to hand over the session of the terminal device from the source base station to the target base station. For example, the first handover request is handover required. The first handover request includes information about the target base station and an identifier of a session requested to be handed over. The core network device may determine, by using the information about the target base station, a base station/cell to which the session of the terminal device is to be handed over. The core network device may determine, by using the identifier of the session requested to be handed over, a session to be handed over. There may be one or more sessions requested to be handed over, and different sessions may correspond to different network slices. Different network slices correspond to different network slice indication information.

Optionally, the information about the target base station includes at least one of a base station identity of the target base station, a central unit identity of the target base station, a distributed unit identity of the target base station, a physical cell identifier of the target base station, or a cell global identity of the target base station.

Optionally, the first handover request further includes indication information of a network slice corresponding to the session requested to be handed over. Thus, the core network device can directly determine the network slice corresponding to the session to be handed over, thereby saving time used for searching for the network slice corresponding to the session, reducing a handover delay, and increasing a handover success rate. It can be understood that, the first handover request may not include the indication information of the network slice corresponding to the session requested to be handed over. This is not limited in this embodiment of the present invention.

For example, the core network device is an AMF network element. If the AMF network element cannot store network slice indication information corresponding to a session, network slice indication information corresponding to each session needs to be carried in the first handover request.

Optionally, a first session includes a plurality of data flows. For example, the data flow is a traffic flow or a QoS flow. The first handover request further includes an identifier of a data flow (for example, the identifier of the data flow includes a QoS flow ID) that needs to be established and that is corresponding to the session, and further includes QoS information (for example, priority information) corresponding to each of the plurality of data flows of the session. The core network device includes an AMF network element and an SMF network element on a core network side. The AMF network element first receives a first handover request message sent by the source base station, and the AMF network element sends a second handover request message to the target base station. The second handover request message needs to include an identifier of a data flow of the session to be handed over and QoS information of the data flow. However, the information is not stored in the AMF network element. Therefore, if the information is carried in the first handover request, the AMF network element does not need to obtain the information from the SMF network element, thereby saving search time, reducing a handover delay, and improving handover efficiency.

Optionally, the first handover request further includes aggregate maximum bit rate (AMBR) information corresponding to the session, for example, subscribed AMBR information. The target base station may perform traffic control on the data flow based on this piece of information, but the information needs to be sent by the core network device to the target base station. In this case, the core network device includes the AMF network element and the SMF network element on the core network side. Because the AMF network element does not store this piece of information, the information is added to the first handover request, to reduce time used for searching the SMF network element for the information by the AMF network element. This can save search time, reduce a handover delay, and improve handover efficiency.

Optionally, the first handover request further includes first indication information, and the indication information indicates that the source base station does not determine or does not know a supported network slice of the target base station, so that the core network device obtains that the source base station does not know information about the supported network slice of the target base station. Therefore, the information about the supported network slice of the target base station may be added to a first handover response message. This reduces interaction between the source base station and the target base station, and improves efficiency of obtaining the information about the network slice.

Optionally, the target base station may be a base station that has a communications interface with the source base station, or may be a base station that has no communications interface with the source base station. Optionally, the first handover request may include second indication information indicating that there is no communications interface between the source base station and the target base station. This helps the core network device feed back the information about the supported network slice of the target base station.

Optionally, the source base station selects one of a plurality of base stations that have a communications interface with the source base station as the target base station. Further, the determined target base station supports network slices corresponding to all or some sessions requested to be handed over, so that a handover failure caused because the target base station does not support network slices of all sessions requested to be handed over is avoided, and a quantity of handover failures is reduced, to increase a handover success rate.

Optionally, if the source base station receives a measurement report sent by the terminal device, the source base station may select the target base station based on the measurement report, and perform step 601 to send the handover request to the target base station. The measurement report includes a measurement report value of at least one of a cell and a base station. Optionally, if the measurement report includes a measurement report value of the cell, the included cell may be a cell of the source base station or a cell of another base station. If the measurement report includes a measurement report value of the base station, the included base station may be the source base station or another base station. Optionally, a quantity of cells and a quantity of base stations included in the measurement report are not limited in this embodiment of the present invention.

602. The core network device determines indication information of a network slice corresponding to a session requested to be handed over.

Step 602 is an optional step. If the first handover request does not include the indication information of the network slice corresponding to the session, the core network device may search, based on an identifier of the session requested to be handed over, a stored correspondence between a session identifier and indication information of a network slice for the indication information of the network slice corresponding to the session requested to be handed over. The correspondence stored in the core network device may include an identifier or identifiers of one or more sessions of the terminal device and indication information of a corresponding network slice.

If the first handover request includes the indication information of the network slice corresponding to the identifier of the session requested to be handed over, the core network device may directly determine the indication information of the network slice corresponding to the session requested to be handed over. Time used by the core network device to search for the indication information of the network slice corresponding to the session requested to be handed over can be reduced.

Further, the first handover request may include the information about the target base station, and the core network device determines, based on the information about the target base station, the information about the supported network slice of the target base station. The information about the network slice includes indication information of the supported network slice. In a specific example, the session requested to be handed over is set to a session E1. When there is a communications interface between the target base station and the core network device, if the core network device has obtained information about a first supported network slice of the target base station, the core network device may directly determine indication information of the first supported network slice of the target base station. If the core network device does not obtain the information about the first supported network slice of the target base station, the core network device may obtain, from the target base station, the indication information of the first supported network slice of the target base station. Further, the core network device may determine whether the indication information of the first supported network slice of the target base station includes indication information of a second network slice corresponding to the session E1. If the indication information of the first supported network slice of the target base station includes the indication information of the second network slice corresponding to the session E1, it indicates that the target base station supports a network slice corresponding to the session E1. If the indication information of the first supported network slice of the target base station does not include the indication information of the second network slice corresponding to the session E1, it indicates that the target base station does not support the network slice corresponding to the session E1.

Then, if the indication information of the first supported network slice of the target base station does not include indication information of second network slices corresponding to all sessions requested to be handed over, the core network device may determine that the target base station does not support the network slice corresponding to the session requested to be handed over. The core network device may perform step 605 in FIG. 6, and the core network device sends the first handover response message to the source base station. In this case, the first handover response message may be a first handover failure message. The first handover failure message includes reject indication information used to indicate that the target base station does not support network slices corresponding to all the sessions requested to be handed over. Optionally, the reject indication information may be indicated by using an IE, a flag, a cause, or the like, and this is not limited in this embodiment of the present invention.

Alternatively, if the target base station supports network slices corresponding to all or some sessions requested to be handed over, the core network device performs step 603 in FIG. 6, and the core network device sends a second handover request to the target base station.

603. The core network device sends a second handover request to the target base station.

For example, the second handover request is a handover request. The second handover request includes the session identifier corresponding to the session requested to be handed over and the indication information of the network slice corresponding to the session requested to be handed over.

Optionally, the second handover request includes session identifiers of all sessions requested by the source base station to be handed over and indication information of a network slice corresponding to each session.

Optionally, after the core network device performs step 602, the core network device may classify the sessions requested by the source base station to be handed over into a first session and a second session. A network slice corresponding to the first session is supported by the target base station. A network slice corresponding to the second session is not supported by the target base station. Further, the second handover request may include only an identifier of the first session and indication information of the network slice corresponding to the first session. Or, the second handover request includes the identifier of the first session, an identifier of the second session, the indication information of the network slice corresponding to the first session, and indication information of the network slice corresponding to the second session. This is not limited in the embodiments of the present invention.

Correspondingly, the target base station receives the second handover request.

604. The target base station sends a second handover failure message to the core network device.

The target base station receives the second handover request from the core network device and determines whether the target base station can serve the session included in the second handover request. If the target base station cannot serve any session, the second handover response message sent to the core network device in step 604 in FIG. 6 may be the second handover failure message, for example, a handover request failure or a handover failure, The second handover failure message may also be a handover preparation failure message. The second handover failure message includes cause information corresponding to a rejected session.

Further, the cause information of the rejected session may be: the target base station does not support a network slice corresponding to the rejected session, or a resource is not available for a network slice being supported by the target base station and corresponding to the rejected session.

For specific implementation of the second handover failure message in this embodiment of the present invention, refer to specific descriptions of the handover failure message in step 403 in the embodiment shown in FIG. 4. Details are not described herein again.

Correspondingly, the core network device receives the second handover failure message sent by the target base station.

605. The core network device sends a first handover response message to the source base station.

The core network device sends the first handover response message to the source base station. In this embodiment, the first handover response message is the first handover failure message. For example, the first handover failure message is a handover preparation failure message. The first handover response message includes the reject indication information. The reject indication information is used to indicate cause information corresponding to a session, which is rejected by the target base station due to a network slice, from the session requested to be handed over.

Optionally, the first handover failure message includes an identifier of a rejected session and cause information corresponding to the identifier of the rejected session.

Optionally, if the core network device sends, to the target base station, identifiers of all sessions requested by the source base station to be handed over, the identifier of the rejected session and the cause information corresponding to the rejected session that are included in the first handover failure message are the same as the identifier of the rejected session and the cause information corresponding to the rejected session that are included in the second handover failure message.

Optionally, if the core network device sends, to the target base station, the identifier of the first session in all the sessions requested by the source base station to be handed over, and the first session is a session that is in the sessions requested to be handed over and whose corresponding network slice is supported by the target base station, the first handover failure message includes an identifier of a first rejected session, cause information corresponding to the first rejected session, an identifier of a second rejected session, and cause information corresponding to the second rejected session. The first rejected session is a session that is rejected and that is included in the second handover failure message, and the second rejected session is a session that in the sessions requested to be handed over and whose corresponding network slice is not supported by the target base station. The identifier of the second rejected session and the cause information corresponding to the second rejected session are determined by the core network device.

Optionally, the core network device adds, to the first handover response message, the information about the supported network slice of the target base station, for example, if the first handover request includes the first indication information indicating that the source base station does not know the supported network slice of the target base station, or the core network device determines, based on an indication that is carried in the first handover request and that indicates that there is no communications interface between the source base station and the target base station, that the source base station does not know the supported network slice of the target base station. This reduces interaction between the source base station and the target base station, and improves efficiency of obtaining the information about the network slice.

606. Optionally, the source base station sends an RRC connection release message to the terminal device.

For step 606, refer to detailed descriptions of step 404 in the embodiment shown in FIG. 4. Details are not described herein again.

In this embodiment of the present invention, after the source base station sends the handover request to the core network device, the source base station can obtain the cause information of the session, which is rejected by the target base station, due to a network slice, to help provide information for another session that needs to be requested to be handed over to the target base station. When a session corresponding to the same network slice needs to be handed over from the source base station, the source base station may directly determine whether the session can be handed over to the target base station, thereby increasing a handover success rate.

Figure 7:
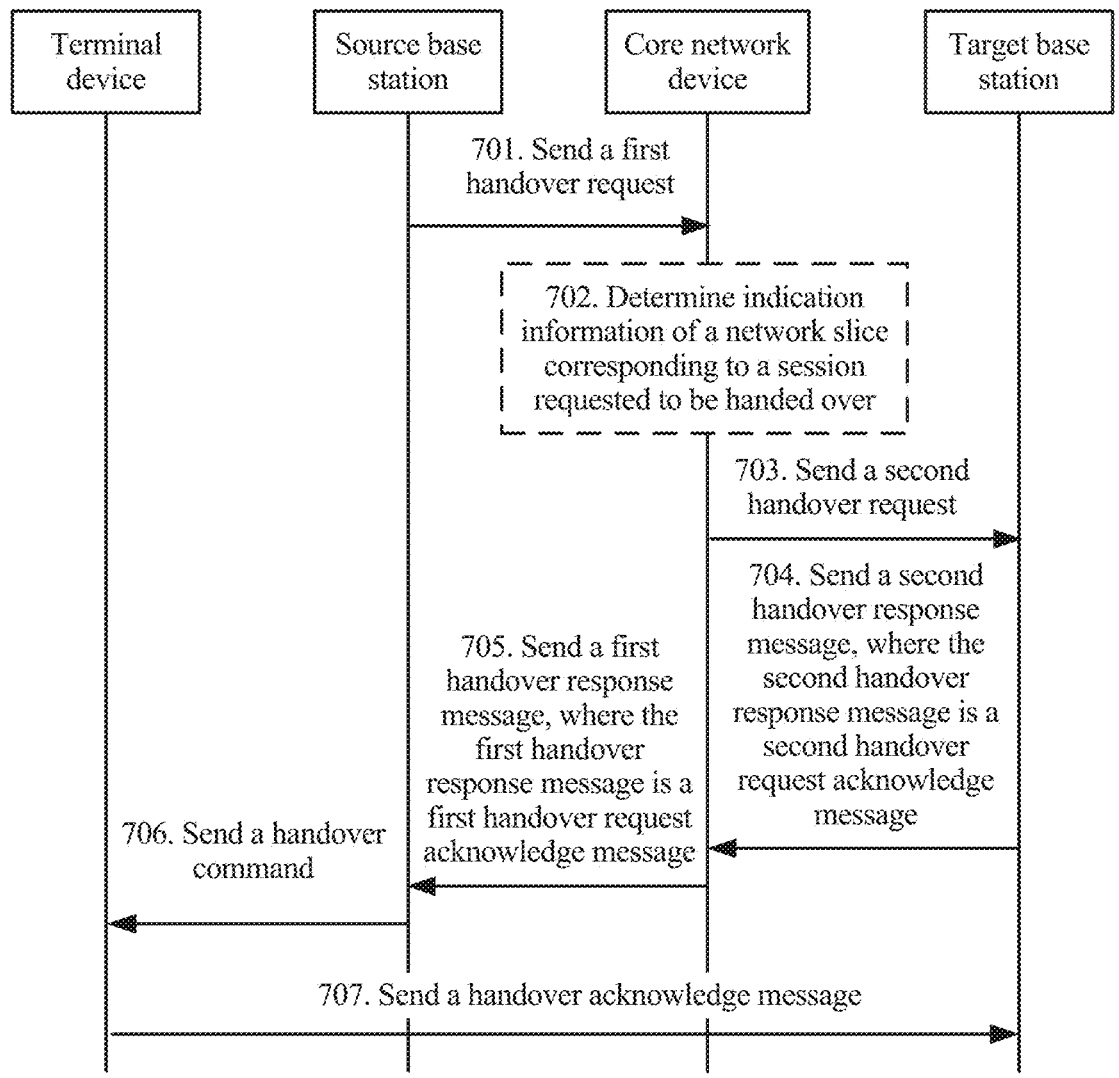
FIG. 7 is a schematic flowchart of another communication method according to an embodiment of the present invention.

Referring to FIG. 7, FIG. 7 shows another communication method according to an embodiment of the present invention. In this embodiment, an example in which an access network device is a base station is used for description. As shown in FIG. 7, the communication method relates to a terminal device, a source base station, a target base station, and a core network device. FIG. 7 is corresponding to a communication method used when the core network device determines that handover succeeds. The source base station is a base station that currently establishes a communication connection to the terminal device, and the target base station is a base station to which a session of the terminal device is requested to be handed over.

As shown in FIG. 7, the communication method includes step 701 to step 707. For details, refer to the following specific descriptions.

701. The source base station sends a first handover request to the core network device.

702. The core network device determines indication information of a network slice corresponding to a session requested to be handed over.

703. The core network device sends a second handover request to the target base station.

For step 701 to step 703, refer to corresponding detailed descriptions of steps 601 to 603 in the embodiment shown in FIG. 6. Details are not described herein again.

704. The target base station sends a second handover request acknowledge message to the core network device.

The second handover request acknowledge message includes an identifier of an accepted session. For example, the second handover request acknowledge message is handover request acknowledge.

Optionally, the first handover response message may further include an identifier of a rejected session and cause information corresponding to the rejected session.

Optionally, the second handover request acknowledge message further includes retransmission indication information corresponding to the rejected session. The retransmission indication information is used to indicate whether the terminal device is allowed to route, to a supported network slice of the target base station, a data flow of the rejected session. For example, the rejected session is a session B1 and the session B1 corresponds to a network slice 1. Cause information of the rejected session B1 may be that: the target base station does not support the network slice 1 corresponding to the session B1, or the target base station supports the network slice 1 but a resource is not available for the network slice 1. Regardless of a reason for rejecting the session B1, if the target base station supports a network slice 2, and a data flow of the session B1 is routed to the network slice 2, data transmission can also be implemented. In this case, the target base station determines that retransmission indication information corresponding to the session B1 is: the terminal device is allowed to route the data flow of the session B1 to the network slice 2 supported by the target base station. In addition, if a network slice to which the data flow of the session B1 can be routed does not exist in the target base station, the target base station determines that the retransmission indication information corresponding to the session B1 is: the terminal device is not allowed to route the data flow of the session B1 to the supported network slice of the target base station.

Optionally, the handover request acknowledge message further includes an identifier of a rejected bearer or an identifier of a rejected data flow of the session requested to be handed over. For details, refer to detailed descriptions of step 303 in the embodiment shown in FIG. 3. Details are not described herein again.

The second handover request acknowledge message in this embodiment of the present invention can refer to the handover request acknowledge message in the embodiment shown in FIG. 3. The second handover request acknowledge message includes the identifier of the accepted session, the identifier of the rejected session, and the cause information corresponding to the rejected session. The second handover request acknowledge message is sent to the core network device 705. The core network device sends a first handover request acknowledge message to the source base station.

The core network device sends a first handover response message to the source base station. In this embodiment, the first handover response message is the first handover request acknowledge message. For example, the first handover request acknowledge message is a handover command. The first handover request acknowledge message includes the identifier of the accepted session.

Optionally, the first handover response message may further include the identifier of the rejected session and the cause information corresponding to the rejected session.

Optionally, if the core network device sends, to the target base station, identifiers of all sessions requested by the source base station to be handed over, an identifier of a rejected session and cause information corresponding to the rejected session that are included in the first handover request acknowledge message are the same as an identifier of a rejected session and cause information corresponding to the rejected session that are included in the second handover request acknowledge message.

Optionally, if the core network device sends, to the target base station, an identifier of a first session in all the sessions requested by the source base station to be handed over, and the first session is a session that is in the sessions requested to be handed over and whose corresponding network slice is supported by the target base station, the first handover request acknowledge message includes an identifier of a first rejected session, cause information corresponding to the first rejected session, an identifier of a second rejected session, and cause information corresponding to the second rejected session. The first rejected session is a session that is rejected and that is included in the second handover request acknowledge message, and the second rejected session is a session that in the sessions requested to be handed over and whose corresponding network slice is not supported by the target base station. The identifier of the second rejected session and the cause information corresponding to the second rejected session are determined by the core network device.

Optionally, the core network device adds, to the first handover response message, information about the supported network slice of the target base station. For example, the first handover request includes first indication information indicating that the source base station does not know the supported network slice of the target base station, or the core network device determines, based on an indication that is carried in the first handover request and that indicates that there is no communications interface between the source base station and the target base station, that the source base station does not know the supported network slice of the target base station. This reduces interaction between the source base station and the target base station, and improves efficiency of obtaining the indication information of the network slice.

706. The source base station sends a handover command to the terminal device.

707. The terminal device sends a handover acknowledge message to the target base station.

For step 706 and step 707, refer to detailed descriptions of step 304 and step 305 in the embodiment shown in FIG. 3. Details are not described herein again.

In this embodiment of the present invention, after the source base station sends the handover request to the core network device, the source base station can obtain the cause information of the session, which is rejected by the target base station, due to a network slice, to help provide information for another session that needs to be requested to be handed over to the target base station. When a session corresponding to the same network slice needs to be handed over from the source base station, the source base station may directly determine whether the session can be handed over to the target base station, thereby increasing a handover success rate.

Figure 8:
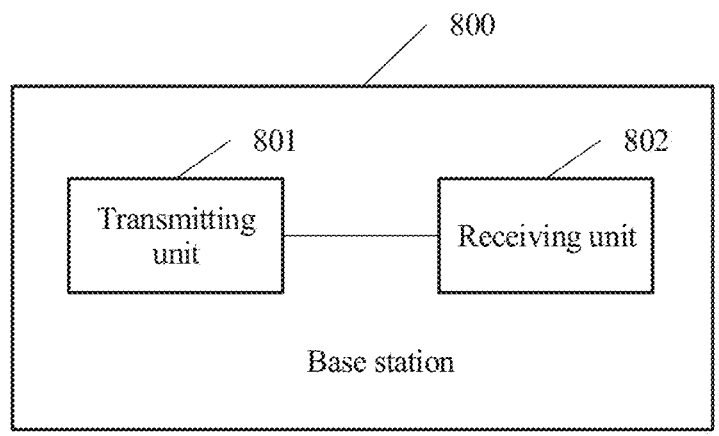
FIG. 8 is a schematic structural diagram of a base station according to an embodiment of the present invention.

Referring to FIG. 8, FIG. 8 is a schematic structural diagram of a base station according to an embodiment of this application. The base station may be a source base station and is configured to implement the embodiment in FIG. 3 or FIG. 4. As shown in FIG. 8, the source base station includes:

a transmitting unit 801, configured to send a handover request to a target base station, where the handover request is used to request to hand over a session of a terminal device from the source base station to the target base station, and the handover request includes an identifier of a session requested to be handed over and indication information of a network slice corresponding to the session; and a receiving unit 802, configured to receive a handover response message from the target base station, where the handover response message includes reject indication information, and the reject indication information is used to indicate cause information corresponding to a session, which is rejected by the target base station due to a network slice, from the session requested to be handed over.

Optionally, the session requested to be handed over includes a first session, or the session requested to be handed over includes the first session and a second session.

A network slice corresponding to the first session is supported by the target base station, and a network slice corresponding to the second session is not supported by the target base station.

Optionally, the cause information is that: the target base station does not support a network slice corresponding to the rejected session, or a resource is not available for a network slice being supported by the target base station and corresponding to the rejected session.

Optionally, if the handover response message is a handover request acknowledge message, the handover response message further includes retransmission indication information corresponding to the session that is rejected by the target base station, and the retransmission indication information corresponding to the session is used to indicate whether the terminal device is allowed to route, to a supported network slice of the target base station, a data flow of the rejected session.

Optionally, the source base station sends a handover command to the terminal device if the handover response message is a handover request acknowledge message, where the handover command includes the retransmission indication information corresponding to the session that is rejected by the target base station.

Optionally, if the handover response message is a handover request acknowledge message, the handover request acknowledge message further includes an identifier of a rejected bearer or an identifier of a rejected data flow of the session requested to be handed over.

Optionally, the transmitting unit 801 is further configured to send a radio resource control RRC connection release message to the terminal device if the handover response message is a handover failure message.

Optionally, the RRC connection release message includes indication information of a neighboring cell of a source cell, indication information of a network slice supported by a TA/RA to which the neighboring cell of the source cell belongs, or information about a network slice supported by a neighboring base station of the source base station.

It can be understood that, for specific implementations and corresponding beneficial effects of function blocks included in the base station in FIG. 8, refer to specific descriptions of the foregoing embodiment in FIG. 3 or FIG. 4. Details are not described herein again.

In this patent application, the transmitting unit may be a transmitter, and the receiving unit may be a receiver.

Figure 9:
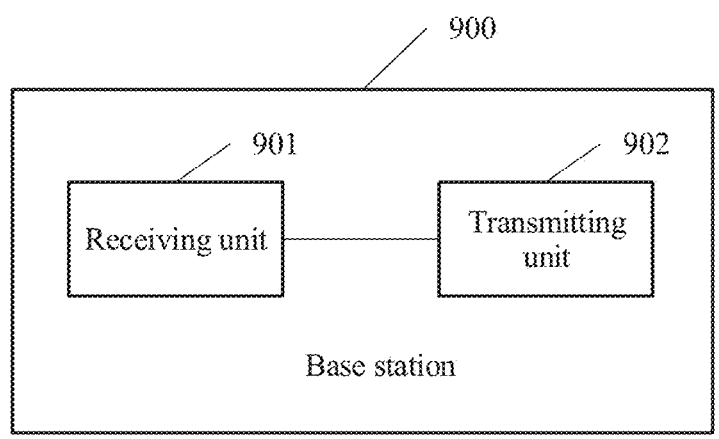
FIG. 9 is a schematic structural diagram of a base station according to an embodiment of the present invention.

Referring to FIG. 9, FIG. 9 is a schematic structural diagram of a base station according to an embodiment of this application. The base station may be a target base station and is configured to implement the embodiment in FIG. 3 or FIG. 4. As shown in FIG. 9, the target base station includes:

a receiving unit 901, configured to receive a handover request from a source base station, where the handover request is used to request to hand over a session of a terminal device from the source base station to the target base station, and the handover request includes an identifier of a session requested to be handed over and indication information of a network slice corresponding to the session; and a transmitting unit 902, configured to send a handover response message to the source base station, where the handover response message includes reject indication information, and the reject indication information is used to indicate cause information corresponding to a session, which is rejected by the target base station due to a network slice, from the session requested to be handed over.

Optionally, the session requested to be handed over includes a first session, or the session requested to be handed over includes the first session and a second session.

A network slice corresponding to the first session is supported by the target base station, and a network slice corresponding to the second session is not supported by the target base station.

Optionally, the cause information is that: the target base station does not support a network slice corresponding to the rejected session, or a resource is not available for a network slice being supported by the target base station and corresponding to the rejected session.

Optionally, the handover response message further includes retransmission indication information corresponding to the session that is rejected by the target base station, and the retransmission indication information corresponding to the session is used to indicate whether the terminal device is allowed to route, to a network slice supported by the target base station, a data flow of the rejected session.

Optionally, if the handover response message is a handover request acknowledge message, the handover request acknowledge message further includes an identifier of a rejected bearer or an identifier of a rejected data flow of the session requested to be handed over.

Optionally, the receiving unit 901 is further configured to receive a handover acknowledge message from the terminal device.

The transmitting unit 902 is further configured to send a path switch request to a core network device, where the path switch request includes an identifier of a session that is accepted by the target base station and an identifier of a session that is rejected by the target base station.

The receiving unit 901 is further configured to receive a path switch request response message from the core network device, where the path switch request response message includes an identifier of a session for which path switch has been successfully completed.

Optionally, the path switch request further includes indication information of the network slice corresponding to the session that is rejected by the target base station.

Optionally, the path switch request further includes the cause information corresponding to the session that is rejected by the target base station.

It can be understood that, for specific implementations and corresponding beneficial effects of function blocks included in the base station in FIG. 9, refer to specific descriptions of the foregoing embodiment in FIG. 3 or FIG. 4. Details are not described herein again.

Figure 10:
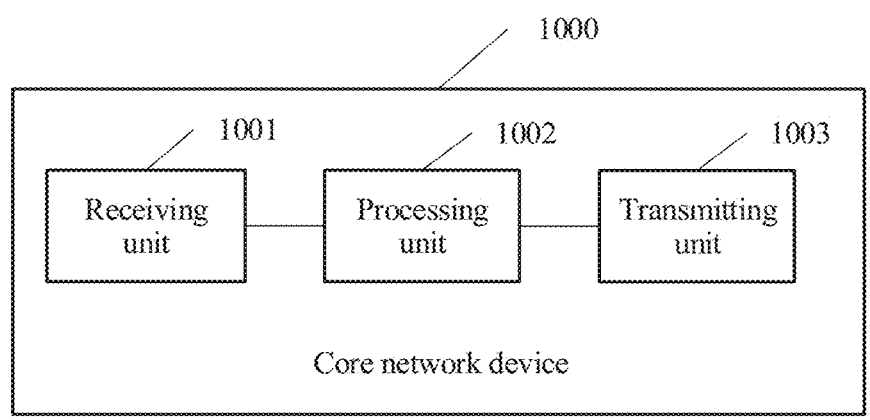
FIG. 10 is a schematic structural diagram of a core network device according to an embodiment of the present invention.

Referring to FIG. 10, FIG. 10 is a schematic structural diagram of a core network device according to an embodiment of this application. The core network device is configured to implement the embodiment in FIG. 4. As shown in FIG. 10, the core network device includes:

a receiving unit 1001, configured to receive a path switch request from a target base station, where the path switch request includes an identifier of a session that is accepted by the target base station and an identifier of a session that is rejected by the target base station;

a processing unit 1002, configured to perform path switching on the accepted session, and perform deactivating or releasing the rejected session; and a transmitting unit 1003, configured to send a path switch request response message to the target base station, where the path switch request response message includes an identifier of a session for which path switch has been successfully completed.

Optionally, the path switch request further includes indication information of a network slice corresponding to the session that is rejected by the target base station.

Optionally, the path switch request includes cause information corresponding to the session that is rejected by the target base station.

Optionally, the cause information is that: the target base station does not support the network slice corresponding to the rejected session, or a resource is not available for a network slice being supported by the target base station and corresponding to the rejected session.

It can be understood that, for specific implementations and corresponding beneficial effects of function blocks included in the core network device in FIG. 10, refer to specific descriptions of the foregoing embodiment in FIG. 4. Details are not described herein again.

In this patent application, the processing unit may be implemented in a form of a processor.

Figure 11:
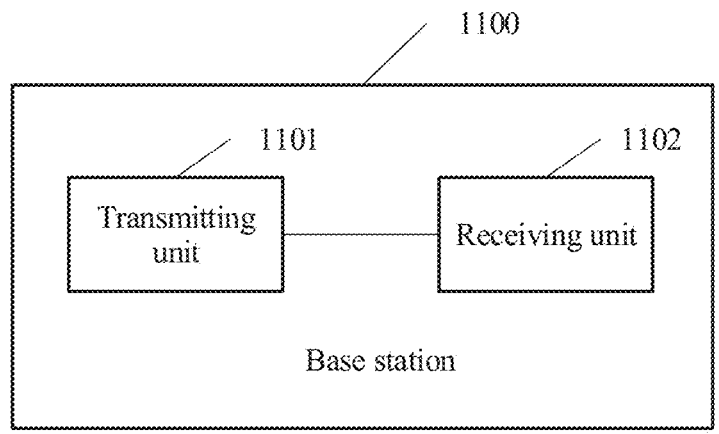
FIG. 11 is a schematic structural diagram of another base station according to an embodiment of the present invention.

Referring to FIG. 11, FIG. 11 is a schematic structural diagram of a base station according to an embodiment of this application. The base station may be a first base station and is configured to implement the embodiment in FIG. 5. As shown in FIG. 11, the base station includes:

a transmitting unit 1101, configured to send a first message to a core network device, where the first message is used to obtain information about a supported network slice of the core network device for a PLMN; and a receiving unit 1102, configured to receive a second message from the core network device, where the second message includes information about a supported network slice of a PLMN served by the core network device.

It can be understood that, for specific implementations and corresponding beneficial effects of function blocks included in the base station in FIG. 11, refer to specific descriptions of the foregoing embodiment in FIG. 5. Details are not described herein again.

Figure 12:
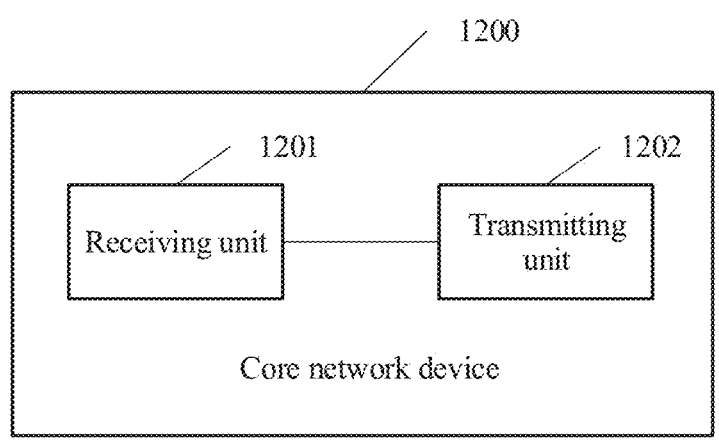
FIG. 12 is a schematic structural diagram of another core network device according to an embodiment of the present invention.

Referring to FIG. 12, FIG. 12 is a schematic structural diagram of a core network device according to an embodiment of this application. The core network device is configured to implement the embodiment in FIG. 5. As shown in FIG. 12, the core network device includes:

a receiving unit 1201, configured to receive a first message from a first base station, where the first message is used to obtain information about a supported network slice of the core network device for a PLMN; and a transmitting unit 1202, configured to send a second message to the first base station, where the second message includes information about a supported network slice of a PLMN served by the core network device.

It can be understood that, for specific implementations and corresponding beneficial effects of function blocks included in the core network device in FIG. 12, refer to specific descriptions of the foregoing embodiment in FIG. 5. Details are not described herein again.

Figure 13:
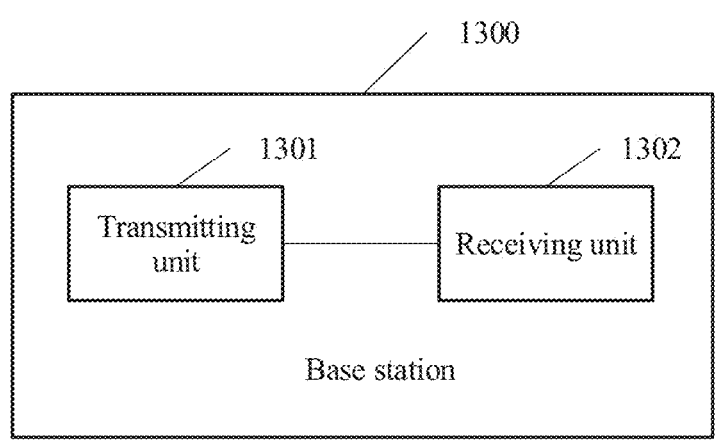
FIG. 13 is a schematic structural diagram of another base station according to an embodiment of the present invention.

Referring to FIG. 13, FIG. 13 is a schematic structural diagram of a base station according to an embodiment of this application. The base station may be a source base station and is configured to implement the embodiment in FIG. 6 or FIG. 7. As shown in FIG. 13, the source base station includes:

a transmitting unit 1301, configured to send a first handover request to a core network device, where the first handover request is used to request to hand over a session of a terminal device from the source base station to a target base station, and the first handover request includes information about the target base station and an identifier of a session requested to be handed over; and a receiving unit 1302, configured to receive a first handover response message from the core network device, where the first handover response message includes reject indication information, and the reject indication information is used to indicate cause information corresponding to a session, which is rejected by the target base station due to a network slice, from the session requested to be handed over.

Optionally, the cause information is that: the target base station does not support a network slice corresponding to the rejected session, or a resource is not available for a network slice being supported by the target base station and corresponding to the rejected session.

Optionally, if the first handover response message is a first handover request acknowledge message, the first handover response message further includes retransmission indication information corresponding to the session that is rejected by the target base station, and the retransmission indication information corresponding to the session is used to indicate whether the terminal device is allowed to route, to a supported network slice of the target base station, a data flow of the rejected session.

Optionally, the transmitting unit 1301 is further configured to send a handover command to the terminal device if the first handover response message is the first handover request acknowledge message, where the handover command includes the retransmission indication information corresponding to the session that is rejected by the target base station.

Optionally, if the first handover response message is the first handover request acknowledge message, the first handover request acknowledge message further includes an identifier of a rejected bearer or an identifier of a rejected data flow of the session requested to be handed over.

Optionally, the transmitting unit 1301 is further configured to send an RRC connection release message to the terminal device if the first handover response message is a first handover failure message.

Optionally, the RRC connection release message includes indication information of a network slice supported by a neighboring cell of the source base station, indication information of a network slice supported by a TA/RA to which the neighboring cell of the source base station belongs, or information about a network slice supported by a neighboring base station of the source base station.

Optionally, if the first handover response message is the first handover request acknowledge message, the first handover request acknowledge message further includes information about the supported network slice of the target base station.

Optionally, the first handover request further includes indication information of a network slice corresponding to the session requested to be handed over.

Optionally, the first handover request further includes an identifier of a data flow of the session that is requested to be handed over and that needs to be established and QoS information corresponding to the data flow.

Optionally, the first handover request further includes aggregate maximum bit rate AMBR information corresponding to the session.

It can be understood that, for specific implementations and corresponding beneficial effects of function blocks included in the base station in FIG. 13, refer to specific descriptions of the foregoing embodiment in FIG. 6 or FIG. 7. Details are not described herein again.

Figure 14:
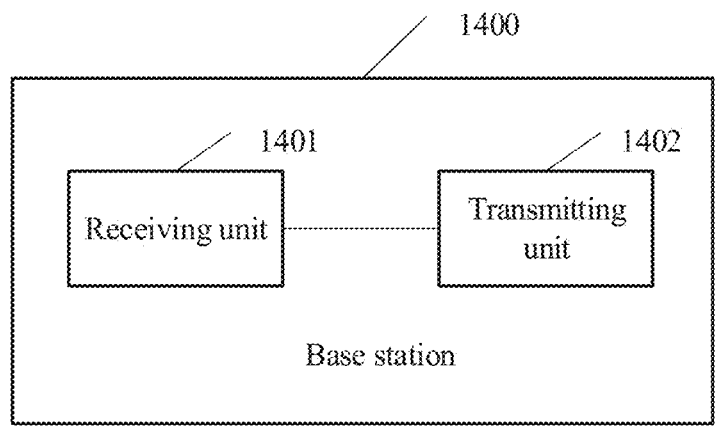
FIG. 14 is a schematic structural diagram of another base station according to an embodiment of the present invention.

Referring to FIG. 14, FIG. 14 is a schematic structural diagram of a base station according to an embodiment of this application. The base station may be a target base station and is configured to implement the embodiment in FIG. 6 or FIG. 7. As shown in FIG. 14, the target base station includes:

a receiving unit 1401, configured to receive a second handover request from a core network device, where the second handover request includes an identifier of a session and indication information of a network slice corresponding to the session; and a transmitting unit 1402, configured to send a second handover response message to the source base station, where the second handover response message includes reject indication information, and the reject indication information is used to indicate cause information corresponding to a session, which is rejected by the target base station due to a network slice, from the session requested to be handed over.

Optionally, the session included in the second handover request is a first session, or the session included in the second handover request is the first session and a second session.

A network slice corresponding to the first session is supported by the target base station, and a network slice corresponding to the second session is not supported by the target base station.

Optionally, the cause information is that: the target base station does not support a network slice corresponding to the rejected session, or a resource is not available for a network slice being supported by the target base station and corresponding to the rejected session.

Optionally, if the second handover response message is a second handover request acknowledge message, the second handover response message further includes retransmission indication information corresponding to the session that is rejected by the target base station, and the retransmission indication information corresponding to the session is used to indicate whether the terminal device is allowed to route, to a supported network slice of the target base station, a data flow of the rejected session.

Optionally, if the second handover response message is the second handover request acknowledge message, the second handover request acknowledge message further includes an identifier of a rejected bearer or an identifier of a rejected data flow of the session included in the second handover request.

It can be understood that, for specific implementations and corresponding beneficial effects of function blocks included in the base station in FIG. 14, refer to specific descriptions of the foregoing embodiment in FIG. 6 or FIG. 7. Details are not described herein again.

Figure 15:
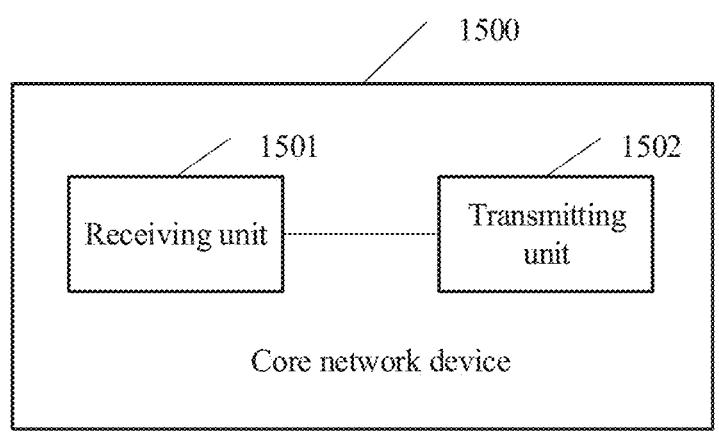
FIG. 15 is a schematic structural diagram of another core network device according to an embodiment of the present invention.

Referring to FIG. 15, FIG. 15 is a schematic structural diagram of a core network device according to an embodiment of this application. The core network device is configured to implement the embodiment in FIG. 6 or FIG. 7. As shown in FIG. 15, the core network device includes:

a receiving unit 1501, configured to receive a first handover request from a source base station, where the first handover request is used to request to hand over a session of a terminal device from the source base station to a target base station, and the first handover request includes information about the target base station and an identifier of a session requested to be handed over; and a transmitting unit 1502, configured to send a first handover response message to the source base station, where the first handover response message includes reject indication information, and the reject indication information is used to indicate cause information corresponding to a session, which is rejected by the target base station due to a network slice, from the session requested to be handed over.

Optionally, the cause information is that: the target base station does not support a network slice corresponding to the rejected session, or a resource is not available for a network slice being supported by the target base station and corresponding to the rejected session.

Optionally, if the first handover response message is a first handover request acknowledge message, the first handover response message further includes retransmission indication information corresponding to the session that is rejected by the target base station, and the retransmission indication information corresponding to the session is used to indicate whether the terminal device is allowed to route, to a supported network slice of the target base station, a data flow of the rejected session.

Optionally, if the first handover response message is the first handover request acknowledge message, the first handover request acknowledge message further includes an identifier of a rejected bearer or an identifier of a rejected data flow of the session requested to be handed over.

Optionally, if the first handover response message is the first handover request acknowledge message, the first handover request acknowledge message further includes information about the supported network slice of the target base station, or indication information of a supported network slice of a TA/RA to which a cell of the target base station belongs.

Optionally, the first handover request further includes indication information of a network slice corresponding to the session requested to be handed over.

Optionally, the first handover request further includes an identifier of a data flow of the session that is requested to be handed over and that needs to be established and QoS information corresponding to the data flow.

Optionally, the first handover request further includes aggregate maximum bit rate AMBR information corresponding to the session.

Optionally, the transmitting unit 1502 is further configured to send a second handover request to the target base station, where the second handover request includes an identifier of a session and indication information of a network slice corresponding to the session.

The receiving unit 1501 is further configured to receive a second handover response message from the target base station, where the second handover response message includes the reject indication information.

Optionally, the session included in the second handover request is a first session, or the session included in the second handover request is the first session and a second session.

A network slice corresponding to the first session is supported by the target base station, and a network slice corresponding to the second session is not supported by the target base station.

Optionally, if the second handover response message is a second handover request acknowledge message, the second handover response message further includes retransmission indication information corresponding to the session that is rejected by the target base station, and the retransmission indication information corresponding to the session is used to indicate whether the terminal device is allowed to route, to a supported network slice of the target base station, a data flow of the rejected session.

Optionally, if the second handover response message is the second handover request acknowledge message, the second handover request acknowledge message further includes an identifier of a rejected bearer or an identifier of a rejected data flow of the session included in the second handover request.

It can be understood that, for specific implementations and corresponding beneficial effects of function blocks included in the core network device in FIG. 15, refer to specific descriptions of the foregoing embodiment in FIG. 6 or FIG. 7. Details are not described herein again.

In this patent application, each determining unit may be implemented in a form of a processor.

Figure 16:
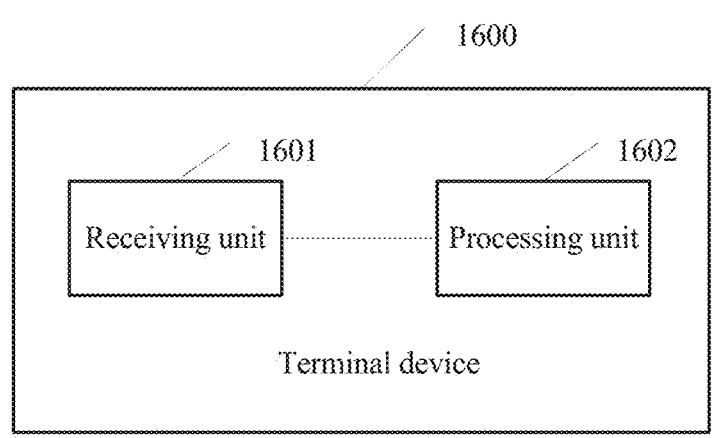
FIG. 16 is a schematic structural diagram of a terminal device according to an embodiment of the present invention.

Referring to FIG. 16, FIG. 16 is a schematic structural diagram of a terminal device according to an embodiment of this application. The terminal device may be a terminal device and is configured to implement the embodiment in FIG. 4 or FIG. 6. As shown in FIG. 16, the terminal device includes:

a receiving unit 1601, configured to receive a radio resource control RRC connection release message from a source base station; and a processing unit 1602, configured to release an RRC connection, where the RRC connection release message includes indication information of a supported network slice of a neighboring cell of a source cell, indication information of a supported network slice of a TA/RA to which the neighboring cell of the source cell belongs, or information about a supported network slice of a neighboring base station of the source base station.

It can be understood that, for specific implementations and corresponding beneficial effects of function blocks included in the terminal device in FIG. 16, refer to specific descriptions of the foregoing embodiment in FIG. 4 or FIG. 6. Details are not described herein again.

Figure 17:
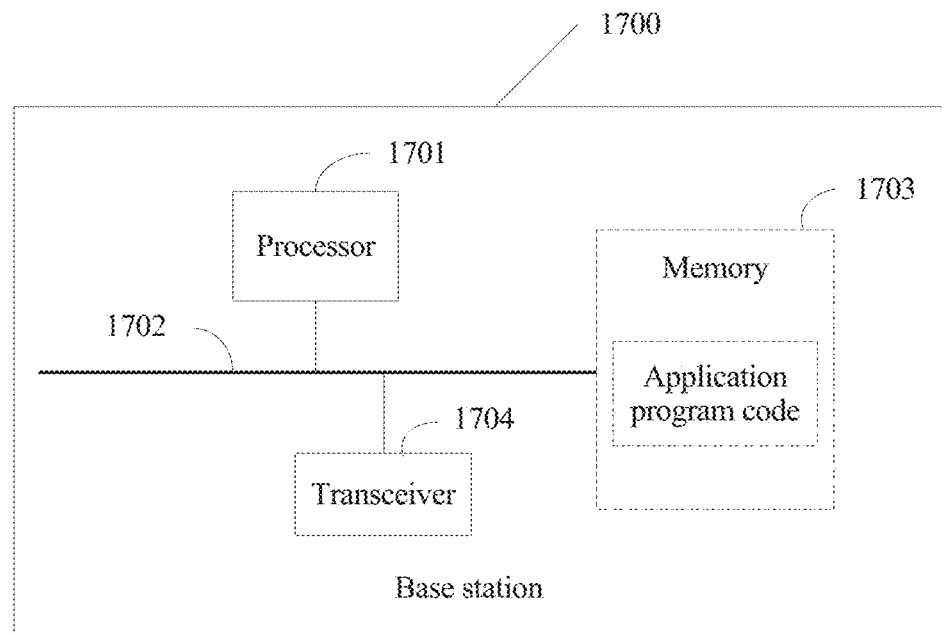
FIG. 17 is a schematic structural diagram of another base station according to an embodiment of the present invention.

The base station in the embodiment shown in FIG. 8, FIG. 9, FIG. 11, FIG. 13, or FIG. 14 may be implemented by a base station 1700 shown in FIG. 17. As shown in FIG. 17, FIG. 17 is a schematic structural diagram of another base station according to an embodiment of the present invention. The base station 1700 shown in FIG. 17 includes a processor 1701 and a transceiver 1702. The transceiver 1702 is configured to support information transmission between the base station 1700 and the core network device or another base station in the foregoing embodiments. The processor 1701 is communicatively connected to the transceiver 1702, for example, connected to the transceiver 1702 by using a bus. The base station 1700 may further include a memory 1703. The memory 1703 is configured to store data and program code that is executed by the base station 1700, and the processor 1701 is configured to execute the application program code stored in the memory 1703, to implement actions performed by the base station provided in any one of the embodiments shown in FIG. 3 to FIG. 7.

It should be noted that, in actual application, the base station may include one or more processors, and a structure of the base station 1700 does not constitute a limitation on this embodiment of this application.

The processor 1701 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 1703 may include a volatile memory, for example, a random access memory (RAM). Alternatively, the memory 1703 may include a non-volatile memory, for example, a read-only memory (ROM), a flash memory, a hard disk drive (HDD), or a solid-state drive (SSD). Alternatively, the memory 1703 may include a combination of the foregoing types of memories.

An embodiment of the present invention further provides a computer storage medium, and the computer storage medium may be configured to store a computer software instruction used by the base station in the embodiment shown in FIG. 8, FIG. 9, FIG. 11, FIG. 13, or FIG. 14. The computer software instruction includes a program that is designed for the base station to perform the foregoing embodiment. The storage medium includes but is not limited to a flash memory, a hard disk drive, and a solid-state drive.

An embodiment of the present invention further provides a computer program product. When being run by a computing device, the computer product can implement the communication method designed for the base station in the embodiment in FIG. 8, FIG. 9, FIG. 11, FIG. 13, or FIG. 14.

Figure 18:
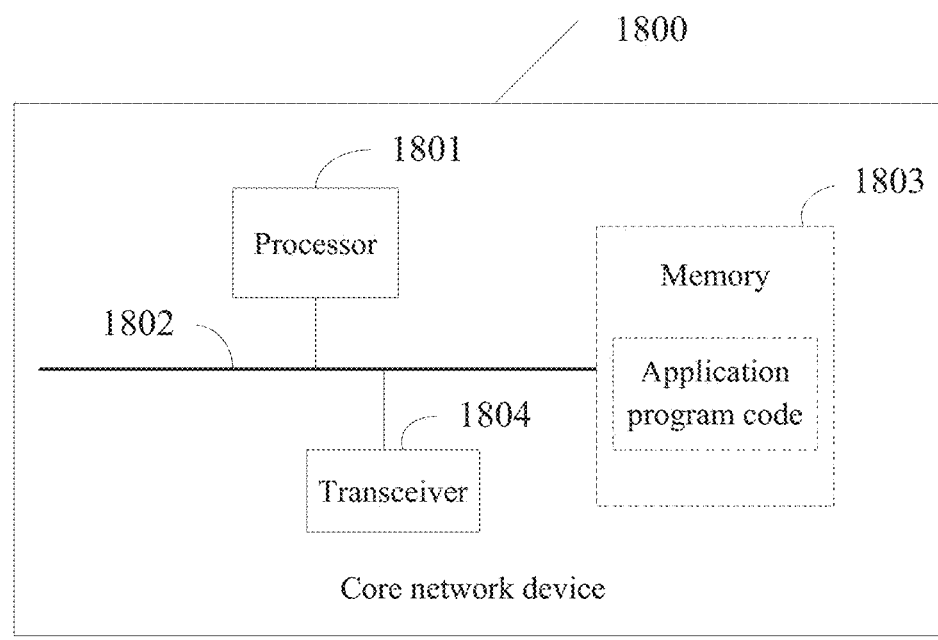
FIG. 18 is a schematic structural diagram of another core network device according to an embodiment of the present invention.

The core network device shown in FIG. 10, FIG. 12, or FIG. 15 may be implemented by a core network device 1800 shown in FIG. 18. As shown in FIG. 18, FIG. 18 is a schematic structural diagram of another core network device according to an embodiment of the present invention. The core network device 1800 shown in FIG. 18 includes a processor 1801 and a transceiver 1802. The transceiver 1802 is configured to support information transmission between the core network device 1800 and the base station in the foregoing embodiments. The processor 1801 is communicatively connected to the transceiver 1802, for example, connected to the transceiver 1802 by using a bus. The core network device 1800 may further include a memory 1803. The memory 1803 is configured to store data and program code that is executed by the core network device 1800, and the processor 1801 is configured to execute the application program code stored in the memory 1803, to implement actions performed by the core network device provided in any one of the embodiments shown in FIG. 4 to FIG. 7.

It should be noted that, in actual application, the core network device may include one or more processors, and a structure of the core network device 1800 does not constitute a limitation on this embodiment of this application.

The processor 1801 may be a CPU, an NP, a hardware chip, or any combination thereof. The hardware chip may be an ASIC, a PLD, or a combination thereof. The PLD may be a CPLD, an FPGA, GAL, or any combination thereof.

The memory 1803 may include a volatile memory, such as a RAM. Alternatively, the memory 1803 may include a nonvolatile memory, such as a ROM, a flash memory, a hard disk drive, or a solid-state drive. Alternatively, the memory 1803 may include a combination of the foregoing types of memories.

An embodiment of the present invention further provides a computer storage medium, and the computer storage medium may be configured to store a computer software instruction used by the core network device in the embodiment shown in FIG. 10, FIG. 12, or FIG. 15. The computer software instruction includes a program that is designed for the core network device to perform the foregoing embodiment. The storage medium includes but is not limited to a flash memory, a hard disk drive, and a solid-state drive.

An embodiment of the present invention further provides a computer program product. When being run by a computing device, the computer product can implement the communication method designed for the core network device in the embodiment in FIG. 10, FIG. 12, or FIG. 15.

Figure 19:
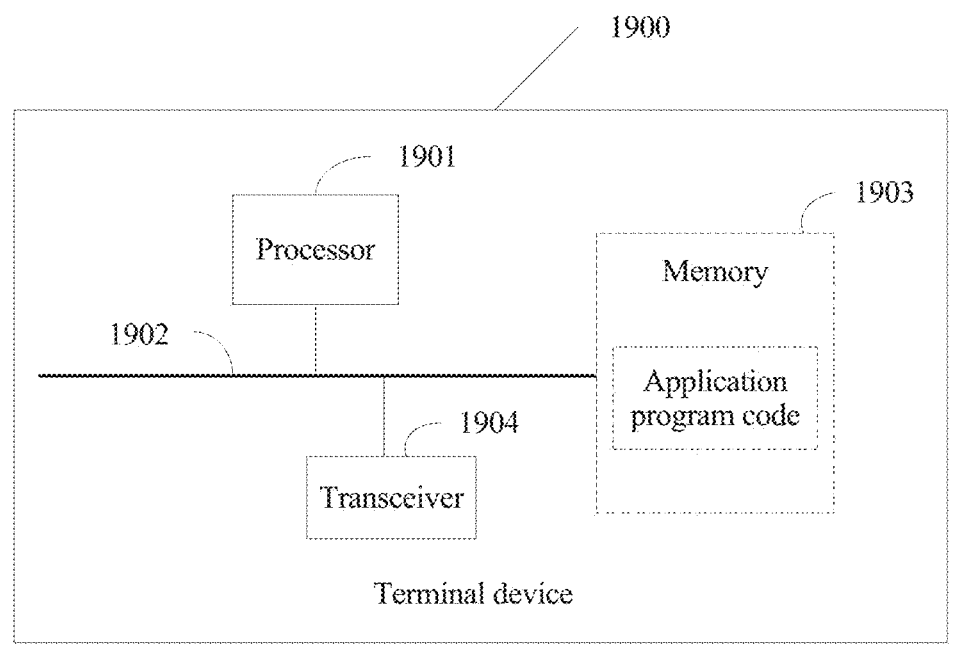
FIG. 19 is a schematic structural diagram of another terminal device according to an embodiment of the present invention.

The terminal device in the embodiment shown in FIG. 16 may be implemented by a terminal device 1900 shown in FIG. 19. As shown in FIG. 19, FIG. 19 is a schematic structural diagram of another terminal device according to an embodiment of the present invention. The terminal device 1900 shown in FIG. 19 includes a processor 1901 and a transceiver 1902. The transceiver 1902 is configured to support information transmission between the terminal device 1900 and the base station in the foregoing embodiments. The processor 1901 is communicatively connected to the transceiver 1902, for example, connected to the transceiver 1902 by using a bus. The terminal device 1900 may further include a memory 1903. The memory 1903 is configured to store data and program code that is executed by the terminal device 1900, and the processor 1901 is configured to execute the application program code stored in the memory 1903, to implement actions performed by the terminal device provided in either the embodiment shown in FIG. 4 or the embodiment shown in FIG. 6.

It should be noted that, in actual application, the terminal device may include one or more processors, and a structure of the terminal device 1900 does not constitute a limitation on this embodiment of this application.

The processor 1901 may be a CPU, an NP, a hardware chip, or any combination thereof. The hardware chip may be an ASIC, a PLD, or a combination thereof. The PLD may be a CPLD, an FPGA, GAL, or any combination thereof.

The memory 1903 may include a volatile memory, such as a RAM. Alternatively, the memory 1903 may include a nonvolatile memory, such as a ROM, a flash memory, a hard disk drive, or a solid-state drive. Alternatively, the memory 1903 may include a combination of the foregoing types of memories.

An embodiment of the present invention further provides a computer storage medium, and the computer storage medium may be configured to store a computer software instruction used by the terminal device in the embodiment shown in FIG. 16. The computer software instruction includes a program that is designed for the terminal device to perform the foregoing embodiment. The storage medium includes but is not limited to a flash memory, a hard disk drive, and a solid-state drive.

An embodiment of the present invention further provides a computer program product. When being run by a computing device, the computer product can perform the communication method designed for the terminal device in the embodiment in FIG. 16.

In the specification, claims, and accompanying drawings of this application, the terms "first", "second", "third", "fourth" and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a Solid State Disk (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A communications method, comprising:
   receiving, by a core network device, a path switch request from a target access network device, wherein the path switch request comprises an identifier of an accepted session that is accepted by the target access network device during handover and an identifier of a rejected session that is rejected by the target access network device during the handover;

performing, by the core network device, path switch of the accepted session;

deactivating or releasing, by the core network device, the rejected session; and sending, by the core network device, a path switch request response message to the target access network device, wherein the path switch request response message comprises an identifier of a session for which path switch has been successfully completed, and cause information indicating a rejection reason for rejecting the rejected session, wherein the cause information indicates at least one of the following:

that the target access network device does not support a network slice corresponding to the rejected session, or that a resource is not available for a network slice corresponding to the rejected session and the network slice is supported by the target access network device.

2. The method according to claim 1, wherein deactivating or releasing, by the core network device, the rejected session, comprising: releasing, by the core network device, the rejected session that is rejected by the target access network device according to the cause information indicating that the target access network device does not support a network slice corresponding to the rejected session.

3. The method according to claim 1, wherein deactivating or releasing, by the core network device, the rejected session, comprising:

deactivating, by the core network device, the rejected session that is rejected by the target access network device according to the cause information indicating that a resource is not available for a network slice corresponding to the rejected session and the network slice is supported by the target access network device.

4. A communications method, comprising: sending, by a target access network device, a path switch request to a core network device, wherein the path switch request comprises an identifier of an accepted session that is accepted by the target access network device, an identifier of a rejected session that is rejected by the target access network device; and receiving, by the target access network device, a path switch request response message from the core network device, wherein the path switch request response message comprises an identifier of a session for which path switch has been successfully completed, and cause information indicating a rejection reason for rejecting the rejected session, wherein the cause information indicates at least one of the following:

that the target access network device does not support a network slice corresponding to the rejected session, or that a resource is not available for a network slice corresponding to the rejected session and the network slice is supported by the target access network device.

5. The method according to claim 4, before sending, by the target access network device, a path switch request to a core network device, further comprising:

receiving, by a target access network device, a handover request from a source access network device, wherein the handover request comprises identifiers of sessions requested to be handed over; and performing, by the target access network device, an admission control based on the handover request.

6. The method according to claim 4, before sending, by the target access network device, a path switch request to a core network device, further comprising:

receiving, by a target access network device, a handover request from a source access network device, wherein the handover request comprises identifiers of sessions requested to be handed over and indication information of a network slice corresponding to the session requested to be handed over; and when the target access network device does not support the network slice corresponding to the session requested to be handed over, rejecting, by the target access network device, the session requested to be handed over.

7. The method according to claim 6, wherein the indication information of the network slice is single network slice selection assistance information (S-NSSAI).

8. The method according to claim 6, wherein the sessions requested to be handed over comprises a first session and a second session, wherein the first session is a session that is supported by the target access network device, and wherein the second session is a session that is not supported by the target access network device.

9. The method according to claim 6, further comprising: sending, by the target access network device, a handover request acknowledge message to the source access network device, wherein the handover request acknowledge message comprises an identifier of a rejected quality of service (QOS) flow.

10. The method according to claim 9, wherein the handover request acknowledge message further comprises information indicating a reason for rejecting the QoS flow.

11. The method according to claim 10, wherein the reason for rejecting the QoS flow comprises one or more of: multiple data flow identifiers, no resource available, or an invalid QoS combination corresponding to the QoS flow.

12. A communications method, comprising: selecting, by a source access network device, a target access network device based on a network slice corresponding to all or some sessions requested to be handed over; sending, by the source access network device, a handover request to the target access network device, wherein the handover request comprises identifiers of sessions requested to be handed over; performing, by the target access network device, an admission control based on the handover request; sending, by the target access network device, a path switch request to a core network device, wherein the path switch request comprises an identifier of an accepted session that is accepted by the target access network device, an identifier of a rejected session that is rejected by the target access network device; and receiving, by the target access network device, a path switch request response message from the core network device, wherein the path switch request response message comprises an identifier of a session for which path switch has been successfully completed, and cause information indicating a rejection reason for rejecting the rejected session, wherein the cause information indicates at least one of the following:

that the target access network device does not support a network slice corresponding to the rejected session, or that a resource is not available for a network slice corresponding to the rejected session and the network slice is supported by the target access network device.

13. The method according to claim 12, wherein the target access network device supports network slices corresponding to one or more sessions requested to be handover.

* * * * *

UNITED STATES PATENT AND TRADEMARK OFFICE
CERTIFICATE OF CORRECTION

| | |
|---|---|
| PATENT NO. | : 12,219,651 B2 |
| APPLICATION NO. | : 18/364932 |
| DATED | : February 4, 2025 |
| INVENTOR(S) | : Yinghao Jin et al. |

Page 1 of 1

It is certified that error appears in the above-identified patent and that said Letters Patent is hereby corrected as shown below:

In the Claims

In Column 53, In Line 2, In Claim 1, delete "handover and an" and insert -- handover, an --.

In Column 54, In Line 28 (Approx.), In Claim 9, delete "(QOS)" and insert -- (QoS) --.

Signed and Sealed this
Fifteenth Day of July, 2025

Coke Morgan Stewart
*Acting Director of the United States Patent and Trademark Office*